US012779404B2

(12) United States Patent
Liu et al.

(10) Patent No.: US 12,779,404 B2
(45) Date of Patent: *Nov. 3, 2026

(54) BICONTINUOUS HIGHLY INTERCONNECTED POROUS POLYMER ULTRAFILTRATION MEMBRANE AS WELL AS PREPARATION METHOD AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yiqun Liu, Beijing (CN); Yu Li, Beijing (CN); Changjiang Wu, Beijing (CN); Guoyuan Pan, Beijing (CN); Yang Zhang, Beijing (CN); Hao Yu, Beijing (CN); Muhua Zhao, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 421 days.

This patent is subject to a terminal disclaimer.

(21) Appl. No.: 18/549,064

(22) PCT Filed: Oct. 28, 2021

(86) PCT No.: PCT/CN2021/127029

§ 371 (c)(1),
(2) Date: Sep. 5, 2023

(87) PCT Pub. No.: WO2022/183751

PCT Pub. Date: Sep. 9, 2022

(65) Prior Publication Data

US 2024/0165566 A1 May 23, 2024

(30) Foreign Application Priority Data

Mar. 5, 2021 (CN) ......................... 202110242563.1
Apr. 28, 2021 (CN) ......................... 202110465718.8
Apr. 28, 2021 (CN) ......................... 202110466664.7

(51) Int. Cl.

| | |
|---|---|
| ***B01D 67/00*** | (2006.01) |
| ***B01D 61/00*** | (2006.01) |
| ***B01D 61/02*** | (2006.01) |
| ***B01D 61/14*** | (2006.01) |
| ***B01D 69/02*** | (2006.01) |

(Continued)

(52) U.S. Cl.

CPC ....... *B01D 69/1251* (2022.08); *B01D 61/002* (2013.01); *B01D 61/027* (2013.01); *B01D 61/145* (2013.01); *B01D 67/0011* (2013.01); *B01D 67/0013* (2013.01); *B01D 67/0016* (2013.01); *B01D 69/02* (2013.01); *B01D 71/56* (2013.01); *C02F 1/442* (2013.01); *C02F 1/444* (2013.01); *C02F 1/445* (2013.01); *B01D 2325/04* (2013.01)

(58) Field of Classification Search

CPC ............ B01D 61/145; B01D 67/00135; B01D 69/02; B01D 2325/04

See application file for complete search history.

(56) References Cited

U.S. PATENT DOCUMENTS

| | | |
|---|---|---|
| 6,110,369 A | 8/2000 | Ditter et al. |
| 8,663,372 B2 | 3/2014 | Romdhane et al. |

(Continued)

FOREIGN PATENT DOCUMENTS

| | | |
|---|---|---|
| CN | 101890303 A | 11/2010 |
| CN | 101920173 A | 12/2010 |

(Continued)

OTHER PUBLICATIONS

Zhang, Lei et al., "Preparation of PES/SPSf blend ultrafiltration membranes with high performance via H2O-induced gelation phase separation", Journal of Membrane Science, Jun. 21, 2017, vol. 540, pp. 136-145, ISSN: 0376-7388.

(Continued)

*Primary Examiner* — Bradley R Spies
(74) *Attorney, Agent, or Firm* — NKL Law; Allen Xue

(57) ABSTRACT

A polymer ultrafiltration membrane with a bicontinuous highly interconnected porous structure, a preparation method and applications thereof are provided. The ultrafiltration membrane has a bottom layer and a polymer layer. The polymer layer is divided into a sublayer and a surface layer. The surface layer is of a uniform small pore structure with a narrow pore size distribution. The sublayer is of a bicontinuous highly interconnected three-dimensional network porous structure. The bicontinuous highly interconnected porous structure of the bicontinuous highly interconnected porous ultrafiltration membrane is characterized as follows: in the thickness direction of the sublayer, the cross-sectional porosity on any XY cross-section perpendicular to the thickness direction is 40-90%, preferably 60-90%, and further preferably 70-90%; and the difference in the cross-sectional porosities between any two XY cross-sections does not exceed 10%, preferably not exceed 8%, and also preferably not exceed 5%.

29 Claims, 9 Drawing Sheets

(51) Int. Cl.

| | |
|---|---|
| ***B01D 69/12*** | (2006.01) |
| ***B01D 71/56*** | (2006.01) |
| ***C02F 1/44*** | (2023.01) |

(56) References Cited

U.S. PATENT DOCUMENTS

| | | | |
|---|---|---|---|
| 2014/0332462 | A1 | 11/2014 | Solomon et al. |
| 2016/0263530 | A1 | 9/2016 | Arnusch et al. |

FOREIGN PATENT DOCUMENTS

| | | | |
|---|---|---|---|
| CN | 102160969 | A | 8/2011 |
| CN | 102281938 | A | 12/2011 |
| CN | 102553465 | A | 7/2012 |
| CN | 102908914 | A | 2/2013 |
| CN | 107073411 | A | 8/2017 |
| CN | 109499393 | A | 3/2019 |
| CN | 110280222 | A | 9/2019 |
| CN | 111408281 | A | 7/2020 |
| CN | 111530304 | A | 8/2020 |
| CN | 112774457 | A | 5/2021 |
| EA | 022845 | B1 | 3/2016 |
| JP | 2012139619 | A | 7/2012 |
| JP | 2013022588 | A | 2/2013 |
| JP | 2015013987 | A | 1/2015 |
| JP | 2018039003 | A | 3/2018 |
| RU | 2385182 | C2 | 3/2010 |
| WO | 2012112123 | A1 | 8/2012 |
| WO | 2017050019 | A1 | 3/2017 |
| WO | 2018122308 | A1 | 7/2018 |

OTHER PUBLICATIONS

Peng, Yuelian et al., "Preparation of polysulfone membranes via vapor-induced phase separation and simulation of direct-contact membrane distillation by measuring hydrophobic layer thickness", Desalination, Mar. 1, 2013, vol. 316, pp. 53-66, ISSN: 0011-9164.

Li, Shiwen et al., "The effect of sulfonated polysulfone on the compatibility and structure of polyethersulfone-based blend membranes", Journal of Membrane Science, Apr. 14, 2016, vol. 513, pp. 1-11, ISSN: 0376-7388.

Ghosh, Asim . et al., "Impacts of support membrane structure and chemistry on polyamide-polysulfone interfacial composite membranes", Journal of Membrane Science, Jul. 1, 2009, vol. 336, No. 01-02, pp. 140-148, ISSN: 0376-7388.

Lau, Woei-Jye et al., "Development of microporous substrates of polyamide thin film composite membranes for pressure-driven and osmotically-driven membrane processes: A review", Journal of Industrial and Engineering Chemistry, May 17, 2019, vol. 77, pp. 25-59, ISSN: 1226-086X.

Popova, O., V. et al., "Membranes in chemical and electrochemical processes", South-Russian State Technical University, Novocherkassk, 2005, pp. 1-57.

Slavin, U., "Atomic Absorption Spectroscopy", Chemistry, 1971, p. 46.

Yang, Hongjun et al.; "Formation Polymer Porous Membranes by Water Micro-Droplet-Induced Phase Inversion"; 2014 National Symposium on Polymer Materials Science and Engineering Academic Papers (vol. 2); Oct. 12, 2014; pp. 507-508.

Alayande, Abayomi Babatunde et al.; "High-flux ultrafiltration membrane with open porous hydrophilic structure using dual pore formers"; Chemosphere; Year: 2019; 227; pp. 1-28.

Liang, Yan et al.; "High-flux anti-fouling nanofibrous composite ultrafiltration membranes containing negatively charged water channels"; Journal of Membrane Science; vol. 612, 118382; Jun. 17, 2020; pp. 1-11.

BICONTINUOUS HIGHLY INTERCONNECTED POROUS POLYMER ULTRAFILTRATION MEMBRANE AS WELL AS PREPARATION METHOD AND APPLICATION THEREOF

TECHNICAL FIELD

The present invention relates to the field of membrane separation, specifically to a polymer ultrafiltration membrane having a sublayer with a bicontinuous highly interconnected porous structure, as well as a preparation method and an application, in particular to a composite nanofiltration membrane and a composite forward osmosis membrane manufactured therefrom.

BACKGROUND ART

In the modern society, demands for water resources are increasing, but freshwater resources are increasingly threatened and encroached upon by environmental pollution. With membrane water-purification technologies, a transformation from the laboratory research to the industrial application can be realized effectively. Among them, ultrafiltration (UF) membranes have been widely applied at present in various fields such as industry and daily life.

Common ultrafiltration membranes are asymmetric and have a thin surface layer with membrane pores covering a more open structure, thereby providing a mechanical strength for the membranes. The ultrafiltration membranes have a pore size ranging from 1 to 100 nm, and involve a major filtration mechanism of sieving, also known as volume exclusion.

Under the same external conditions, the porosity, the pore size, and the thickness of the membrane material per se are important factors affecting the separation flux thereof. It was reported in the document (Chemosphere 2019, 227, 662-669) that: polyvinyl pyrrolidone (PVP) and hydroxypropyl-β-cyclodextrin (HP-b-CD) used as dual pore-forming agents can synergistically improve the permeability of polysulfone (PSf) ultrafiltration membranes. The addition of dual pore-forming agents strengthened the open-pore structure of the membrane, and increased the surface pore size and the cross-sectional finger-shaped pores of the membrane. It was reported in the document (Journal of Membrane Science 2020, 612, 118382) that the permeability of high-throughput nanofiber ultrafiltration membranes prepared by using the electrospun polyacrylonitrile (PAN) nanofibers deposited on nonwoven fabrics as the support layer and the nanocellulose composite PAN as the surface layer was significantly improved; the interpenetrating nanofiber-polymer network formed in the separation layer greatly enhanced the mechanical strength of the composite membrane and provided a water channel. With regard to the liquid separation membranes, it is well known that electrospinning methods have a lower membrane preparation efficiency and a high preparation cost. In addition, there are also methods such as the organic-inorganic hybrid metal grid membrane (CN110280222A) and the membrane surface chemical grafting (CN109499393A), but there are also problems such as the narrower separation application scope, the complex preparation process, and the high cost.

Therefore, it appears particularly important to provide a high-performance ultrafiltration membrane that not only meets the separation performance requirements of separation membranes, but also meets the requirements of the low raw material cost, the low preparation cost, and the simple preparation process.

In addition, various composite membranes, such as composite nanofiltration membranes and composite forward osmosis membranes, also have a very important practical significance and a commercial value.

CONTENTS OF THE INVENTION

The object of the present invention is to overcome the aforementioned problems existing in the prior art and provide a high-performance polymer ultrafiltration membrane, as well as the preparation method and the application. The preparation process of this ultrafiltration membrane is highly efficient, and this ultrafiltration membrane has a high water flux, and simultaneously possesses a separation surface layer of a small pore structure with a narrow pore size distribution and a sublayer of a bicontinuous highly interconnected porous structure.

One object of the present invention is to provide a polymer ultrafiltration membrane with a bicontinuous highly interconnected porous structure (referred to as a bicontinuous highly interconnected porous ultrafiltration membrane in the present invention), which includes a bottom layer and a polymer layer, wherein the polymer layer is divided into a sublayer and a surface layer, the surface layer is of a uniform small pore structure with a narrow pore size distribution, and the sublayer is of a bicontinuous highly interconnected three-dimensional network porous structure.

The surface layer is a separation layer of a small pore structure with a narrow pore size distribution, and has a mean pore size of 2-100 nm.

The polymer layer is of an asymmetric structure, and has a thin surface layer that plays a role of separation and screening, and a sublayer that is attached to a bottom layer and has a bicontinuous highly interconnected porous structure which can reduce the water transferring resistance and increase the water flux.

The thickness of the bottom layer is 50-300 μm, the thickness of the sublayer is 10-60 μm, and the thickness of the surface layer is 0.5-5 μm.

The (bulk) porosity of the polymer layer is 40-90%, preferably 60-90%, and more preferably 70-90%.

In this regard, it is known in the art that the pure water flux and the rejection rate of the ultrafiltration membrane are important indicators for evaluating the selective permeability performance of the ultrafiltration membrane. The volume of the pure water that permeates through a unit membrane area per unit time under a certain operating pressure and at a certain temperature is an important indicator that characterizes the ultrafiltration membrane performance. The pure water flux of the ultrafiltration membrane during the present experiment was tested under an operating pressure of 0.1 MPa and a water temperature of 25° C. After accurately measuring the volume of the filtered solution within a certain period of time, the pure water flux J was calculated according to formula (1).

$$J=V/(S\times t), \quad (1)$$

In formula (1), J represents the pure water flux ($L/m^2h$) of the ultrafiltration membrane, V represents the volume (L) of the filtrate, S represents the effective filtration area ($m^2$) of the ultrafiltration membrane, and t represents the time (h) taken to reach the volume V of the filtrate.

Using a sublayer in combination with a surface layer as a polymer layer (interchangeably used with the term "porous support layer" in the present invention) is common in the art. In the prior art, the known structures of the sublayer generally include a sponge-like pore structure and a large finger-like pore structure. It is also known that the sponge-like pore structure and the large finger-like pore structure often lack a sufficient continuity in the pore channel, affecting the water flux thereof. Likewise, the sponge-like pore structure and the large finger-like pore structure also involve a case where some pores are not able to interconnect in the cross-section of the sublayer, as would clearly affect the water flux of the ultrafiltration membrane.

In contrast, in the ultrafiltration membrane of the present invention, the sublayer is of a bicontinuous highly interconnected three-dimensional network porous structure, wherein the pores are interconnected with each other, the skeletons are interconnected with each other, and the porous structure is highly interconnected and has a larger porosity. The bicontinuous porous structure is of a three-dimensional random porous structure, which is interconnected and presents a three-dimensional network structure.

The cross-section of the sublayer is of a structure of polymer fiber skeletons and pores that maintain a basically consistent morphology along the membrane thickness direction, that is, the cross-section of the sublayer is of a structure with polymer fiber skeletons and the same type of pores distributed along the membrane thickness direction. The same type of pores refers to a phenomenon that the pore types distributed on the entire sublayer cross-section are of the same type and there is no sublayer having different types of pores. For example, the ultrafiltration membrane obtained according to the traditional non-solvent induced phase separation method often has different types of pore structures appearing simultaneously on the sublayer cross-section, generally including sponge-like pore structures and large finger-like pore structures.

Three-dimensional structures, from the perspective of solid geometry, can be defined and described using the three-dimensional coordinate of X, Y, and Z axes. For the sake of convenience, in the present invention, the plane at which the surface on which the sublayer comes into contact with the surface layer (herein, those skilled in the art can understand that the contact "surface" does not have to be a geometric plane) is located and the opposite side thereof are defined as a plane defined by X and Y axes, called XY surface (the two opposite surfaces), where the X and Y axes are the length and width directions respectively. Herein, those skilled in the art can understand that for the structure of the present invention, the selection of X-axis and Y-axis, as well as the corresponding length and width directions, is not important. For example, a direction with larger dimension can be determined as X-axis and the length direction, while the other direction can be determined as Y-axis and the width direction. Correspondingly, the direction perpendicular to the XY surface (the surface on which the sublayer comes into contact with the surface layer) is the "thickness" direction in the conventional sense of the art, and is the Z-axis direction of the three-dimensional coordinate system; therefore, this sublayer is correspondingly defined as having two opposite XZ surfaces and two opposite YZ surfaces.

In the present invention, with regard to the sublayer, there is a cross-section perpendicular to the Z-axis and parallel to the XY surface in the thickness direction of the sublayer, called the XY cross-section. There are also correspondingly a YZ cross-section and an XZ cross-section in other length and width directions. It is understood that these XY, XZ or YZ surfaces per se can also be considered as cross sections.

Without being bound by any known theory, it is believed that thanks to the bicontinuous highly interconnected three-dimensional network porous structure of the present invention, the pores of the polymer layer (especially the sublayer) have a high porosity in the three-dimensional structure and a uniformity of porosity in various directions. Therefore, it is believed that the sublayer would have a (bulk) porosity substantially consistent with the polymer layer, for example 40-90%, preferably 60-90%, and more preferably 70-90%.

Furthermore, according to one embodiment of the present invention, in the thickness direction of the sublayer, the cross-sectional porosity on any XY cross-section perpendicular to the thickness direction is 40-90%, preferably 60-90%, and further preferably 70-90%; and the difference in the cross-sectional porosities between any two XY cross-sections does not exceed 10%, preferably not exceed 8%, and also preferably not exceed 5%.

According to one embodiment of the present invention, in the length direction of the sublayer, the cross-sectional porosity of any YZ cross-section perpendicular to the length direction is 40-90%, preferably 60-90%, and further preferably 70-90%; and the difference in the cross-sectional porosities between any two YZ cross-sections does not exceed 10%, preferably not exceed 8%, and also preferably not exceed 5%.

According to one embodiment of the present invention, in the width direction of the sublayer, the cross-sectional porosity of any XZ cross-section perpendicular to the width direction is 40-90%, preferably 60-90%, and further preferably 70-90%; and the difference in the cross-sectional porosities between any two XZ cross-sections in the width direction does not exceed 10%, preferably not exceed 8%, and also preferably not exceed 5%.

According to one embodiment of the present invention, the difference in the cross-sectional porosities between any one XY cross-section, any one YZ cross-section and any one XZ cross-section is not more than 10%, preferably not more than 8%, and also preferably not more than 5%.

Furthermore, those skilled in the art understand that the porous structure of the sublayer substantively affects the water flux of the ultrafiltration membrane on the one hand; the porous structure of the sublayer can be quantitatively characterized by the water flux on the other hand. That is to say, those skilled in the art understand that the water flux can serve as a structural parameter reflecting the porous structure of the sublayer (and the corresponding ultrafiltration membrane).

Correspondingly, the bicontinuous highly interconnected porous structure of the sublayer contained in the bicontinuous highly interconnected porous ultrafiltration membrane of the present invention is characterized by the water flux as follows:

compared with the conventional ultrafiltration membrane with the same composition but without the bicontinuous highly interconnected pores, A) the water flux of the bicontinuous highly interconnected porous ultrafiltration membrane is at least 30% higher, preferably at least 50% higher, or at least twice as high; and B) the water flux volume equivalent of the bicontinuous highly interconnected porous ultrafiltration membrane is at least 40% higher, preferably at least 50% higher, or at least 80% higher, wherein the water flux volume equivalent is the ratio of the water flux of the ultrafiltration membrane to the bulk porosity of the ultrafiltration membrane.

In one embodiment of the present invention, the bicontinuous highly interconnected porous structure of the bicontinuous highly interconnected porous ultrafiltration membrane is further characterized as follows: compared with the ultrafiltration membrane with the same composition but without the bicontinuous highly interconnected pores, the water flux surface equivalent of the bicontinuous highly interconnected porous ultrafiltration membrane is at least 20% higher, preferably at least 40% higher, or at least 80% higher, wherein the water flux surface equivalent is the ratio of the water flux of the ultrafiltration membrane to the surface mean pore size of the ultrafiltration membrane.

With regard to the object of the present invention, the water flux volume equivalent is the ratio of the water flux of the ultrafiltration membrane to the bulk porosity of the ultrafiltration membrane. Generally speaking, a larger bulk porosity is beneficial for a higher water flux; however, it is easy to understand that due to factors of the continuity and the interconnecting of the pores mentioned earlier, the water flux would not be directly proportional to the bulk porosity. Therefore, the water flux volume equivalent can characterize the porous structure of the ultrafiltration membrane, especially for the bicontinuous, highly interconnected porous structure desired in the present invention.

For the object of the present invention, when calculating the water flux volume equivalent, the numerical value of the water flux is expressed in a conventional unit of "$L/m^2 \cdot h$" (LMH); the bulk porosity is expressed in a conventional unit of "%" and is converted to a decimal during calculation. As an especially-defined equivalent parameter, the water flux volume equivalent is expressed without unit. For example, when the water flux of the ultrafiltration membrane is 300 $L/m^2 \cdot h$ and the bulk porosity is 60%, the water flux volume equivalent thereof is calculated as 300/0.6=500.

For the object of the present invention, the water flux surface equivalent is the ratio of the water flux of the ultrafiltration membrane to the surface mean pore size of the ultrafiltration membrane. Generally speaking, a larger surface mean pore size is beneficial for contacting with more water molecules, thereby facilitating a higher water flux; however, it is easy to understand that due to the factors including, but not limited to, the continuity and the interconnecting of the pores mentioned earlier, as well as the factor of the difference in the membrane internal and surface structures, it is not certain for the water flux to be directly proportional to the surface mean pore size. Therefore, the water flux surface equivalent can characterize the porous structure of the ultrafiltration membrane, especially for the bicontinuous highly interconnected porous structure desired in the present invention.

For the object of the present invention, when calculating the water flux surface equivalent, the numerical value of the water flux is expressed in a conventional unit of "$L/m^2 \cdot h$" (LMH); the surface mean pore size is expressed in a conventional unit of "nm". As a defined equivalent parameter, the water flux surface equivalent is expressed without unit. For example, when the water flux of the ultrafiltration membrane is 300 $L/m^2 \cdot h$ and the surface mean pore size is 20 nm, the water flux volume equivalent thereof is calculated as 300/20=15.

The bicontinuous highly interconnected porous ultrafiltration membrane according to the present invention can be further used for preparing a composite membrane. In particular, the bottom layer and the polymer layer of the bicontinuous highly interconnected porous ultrafiltration membrane according to the present invention can respectively be used as the bottom layer and the porous support layer for constructing a composite nanofiltration membrane or a composite forward osmosis membrane.

Therefore, in one embodiment of the present invention, the present invention provides a composite nanofiltration membrane, which sequentially comprises a bottom layer, a porous support layer, and an active separation layer which is a polyamide layer, wherein the porous support layer is divided into a sublayer and a surface layer, the surface layer is of a small pore structure with a narrow pore size distribution, and the sublayer is attached to the bottom layer and is of an interconnected three-dimensional network porous structure. Preferably, the composite nanofiltration membrane uses the ultrafiltration membrane according to the present invention as the bottom layer and the porous support layer, wherein the polymer layer serves as the porous support layer.

In one embodiment of the present invention, the present invention provides a composite forward osmosis membrane, which sequentially comprises a bottom layer, a porous support layer, and an active separation layer which is an aromatic polyamide layer, wherein, the porous support layer is divided into a sublayer and a surface layer, the surface layer is of a small pore structure with a narrow pore size distribution, and the sublayer is attached to the bottom layer and is of an interconnected three-dimensional network porous structure. Preferably, the composite forward osmosis membrane uses the ultrafiltration membrane according to the present invention as the bottom layer and the porous support layer, wherein the polymer layer serves as the porous support layer.

Correspondingly, with regard to the object of the present invention, the terms "polymer layer" and "porous support layer" can be interchangeably used.

Correspondingly, the various features, limitations, descriptions, numerical values, and examples of the bottom layer and polymer layer of the ultrafiltration membrane in the present invention are generally applicable to the composite membranes using the ultrafiltration membrane, such as the composite nanofiltration membrane and the composite forward osmosis membrane, unless they are not clearly suitable for the specific applications involved. For example, the water flux volume equivalent and the water flux surface equivalent according to the present invention are also respectively applicable to the composite nanofiltration membrane and the composite forward osmosis membrane provided by the present invention.

Polymers for the preparation of the polymer layer can be common choices in the art, including, but not limited to, at least one of polyvinyl chloride, polysulfone, polyethersulfone, sulfonated polyethersulfone, polyacrylonitrile, cellulose acetate, polyvinylidene fluoride, polyimide, polyacrylic acid, polylactic acid, polyamide, chitosan, polyetherimide, polystyrene, polyolefin, polyester, polytrifluorochloroethylene, silicone resin, acrylonitrile-styrene copolymer and the like, and their modified polymers.

In one embodiment of the present invention, the polymer can be polysulfone. According to the present invention, the water flux of the ultrafiltration membrane obtained by using polysulfone can be up to approximately 1200 LMH or higher, approximately 1500 LMH or higher, or approximately 1800 LMH or higher. In one embodiment of the present invention, the water flux volume equivalent of the ultrafiltration membrane obtained by using polysulfone can be up to approximately 1700 or higher, approximately 2000 or higher, or approximately 2300 or higher. In one embodiment of the present invention, the water flux surface equivalent of the ultrafiltration membrane obtained by using polysulfone can be up to approximately 10 or higher, approximately 40 or higher, approximately 60 or higher, or approximately 70 or higher.

According to the present invention, the water flux of the composite nanofiltration membrane obtained by using polysulfone can be up to approximately 100 LMH or higher. In one embodiment of the present invention, the water flux volume equivalent of the composite nanofiltration membrane support layer obtained by using polysulfone can be up to approximately 2000 or higher, approximately 2300 or higher, or approximately 2500 or higher. In one embodiment of the present invention, the water flux surface equivalent of the composite nanofiltration membrane support layer obtained by using polysulfone can be up to about 5 or higher, about 10 or higher, about 40 or higher, or about 60 or higher.

According to the present invention, the water flux of the composite forward osmosis membrane obtained by using polysulfone can be up to approximately 10 LMH or higher (AL-FS), or approximately 20 LMH or higher (AL-DS). In one embodiment of the present invention, the water flux volume equivalent of the composite forward osmosis membrane support layer obtained by using polysulfone can be up to approximately 10 or higher (AL-FS), or approximately 30 or higher (AL-DS). In one embodiment of the present invention, the water flux surface equivalent of the composite forward osmosis membrane support layer obtained by using polysulfone can be up to approximately 0.4 or higher (AL-FS), or approximately 1 or higher (AL-DS).

In one embodiment of the present invention, the polymer can be polyacrylonitrile. According to the present invention, the water flux of the ultrafiltration membrane obtained by using polyacrylonitrile can be up to approximately 300 LMH or higher, approximately 400 LMH or higher, or approximately 500 LMH or higher. In one embodiment of the present invention, the water flux volume equivalent of the ultrafiltration membrane obtained by using polyacrylonitrile can be up to approximately 400 or higher, approximately 500 or higher, or approximately 600 or higher. In one embodiment of the present invention, the water flux surface equivalent of the ultrafiltration membrane obtained by using polyacrylonitrile can be up to approximately 5 or higher, approximately 10 or higher, or approximately 15 or higher.

According to the present invention, the water flux of the composite nanofiltration membrane obtained by using polyacrylonitrile can be up to approximately 80 LMH or higher. In one embodiment of the present invention, the water flux volume equivalent of the composite nanofiltration membrane support layer obtained by using polyacrylonitrile can be up to approximately 400 or higher, approximately 600 or higher, or approximately 1000 or higher. In one embodiment of the present invention, the water flux surface equivalent of the composite nanofiltration membrane support layer obtained by using polyacrylonitrile can be up to about 5 or higher, about 10 or higher, or about 20 or higher.

According to the present invention, the water flux of the composite forward osmosis membrane obtained by using polyacrylonitrile can be up to approximately 8 LMH or higher (AL-FS), or approximately 20 LMH or higher (AL-DS). In one embodiment of the present invention, the water flux volume equivalent of the composite forward osmosis membrane support layer obtained by using polyacrylonitrile can be up to approximately 10 or higher (AL-FS), or approximately 30 or higher (AL-DS). In one embodiment of the present invention, the water flux surface equivalent of the composite forward osmosis membrane support layer obtained by using polyacrylonitrile can be up to approximately 0.4 or higher (AL-FS), or approximately 1 or higher (AL-DS).

The polymer layer is prepared by an atomization pretreatment and a non-solvent induced phase separation method.

The bottom layer may use the support layer materials for coating a polymer solution in the prior art, and may include, but not limited to, at least one selected from nonwoven fabrics, woven fabrics, polyester screens, and electrospun films.

Another object of the present invention is to provide a method for preparing the polymer ultrafiltration membrane with a bicontinuous highly interconnected porous structure, which includes blade-coating the solution of the polymer into a film on a bottom layer to produce the ultrafiltration membrane via an atomization pretreatment in combination with a non-solvent induced phase separation method.

The atomization pretreatment method of the present invention is significantly different from the usual vapor induced phase separation (VIPS) which refers to the phase separation under a certain high humidity (or a saturated humidity) condition and does not involve an atomized droplet bath.

In the preparation method of the present invention, the film formation of the polymer layer is divided into two steps, namely the atomization pretreatment in combination with the non-solvent induced phase separation method. Firstly stay in an atomized droplet bath for a partial induced phase separation, and then immerse in a non-solvent coagulation bath for a complete phase separation.

The preparation method for the ultrafiltration membrane can be preferably carried out in the following steps:

1) dissolving components containing a polymer in a solvent to prepare a membrane casting solution;
2) blade-coating the membrane casting solution into a film on a bottom layer;
3) performing an atomization pretreatment which is staying in an atomized droplet bath for a certain period of time, wherein one side of the bottom layer uncoated with the membrane casting solution is faced towards atomized droplets, and another side coated with the membrane casting solution is protected from contacting with the atomized droplets;
4) immersing in a coagulation bath to obtain the polymer ultrafiltration membrane.

In other words, the method for preparing the ultrafiltration membrane according to the present invention may comprise the following steps:

1) dissolving components containing a polymer in a solvent to prepare a membrane casting solution;
2) blade-coating the membrane casting solution into a film on a bottom layer to form a bottom layer coated with the membrane casting solution;
3) performing an atomization pretreatment on the bottom layer coated with the membrane casting solution, including staying in a droplet bath, wherein one side of the bottom layer coated with the membrane casting solution is protected from contacting with atomized droplets, and another side of the bottom layer uncoated with the membrane casting solution is faced towards the atomized droplets to obtain an atomization pretreated membrane;
4) immersing the atomization pretreated membrane in a coagulation bath to obtain the ultrafiltration membrane.

The polymer can be selected from polymer materials commonly used for the filtration membranes in the art. The polymer materials used may include, but not limited to, at least one of polyvinyl chloride, polysulfone, polyethersulfone, sulfonated polyethersulfone, polyacrylonitrile, cellulose acetate, polyvinylidene fluoride, polyimide, polyacrylic acid, polylactic acid, polyamide, chitosan, polyetherimide, polystyrene, polyolefin, polyester, polytrifluorochloroethylene, silicone resin, acrylonitrile-styrene copolymer and the like, and their modified polymers.

In step 1), the concentration of the polymer in the membrane casting solution is 60-200 g/L, preferably 80-180 g/L.

The membrane casting solution may also optionally contain the components such as common additives.

The membrane casting solution additive may be a polymer material that can be mutually soluble in a good solvent for the polymer and has hydrophilicity, and may include, but not limited to, at least one of polyvinyl pyrrolidone, polyethylene glycol, polyvinyl alcohol, glycerol, propylene glycol, acetone, polyoxyethylene polyoxypropylene ether block copolymers, etc. The membrane production additive may also include commonly used inorganic salt pore-forming agents, poor solvents, and/or various inorganic nanoparticles such as nanoscale inorganic fillers required in the preparation process of filtration membranes, including, but not limited to, zinc chloride, lithium chloride, magnesium chloride, lithium bromide, water, various small molecule alcohols, etc; inorganic fillers include manganese dioxide, silicon dioxide, zinc oxide, etc.

The amount of the membrane casting solution additive is a conventional amount, and in the present invention, it is preferable that the concentration of the polymer additive is 1-200 g/L; the concentration of the small molecule additive is 0.5-50 g/L.

In step 1), the solvent is a good solvent that can dissolve the polymer and optionally the membrane casting solution additive, including, but not limited to, at least one of N,N-dimethylformamide, N,N-dimethylacetamide, acetone, N-methyl-2-pyrrolidone, dimethyl sulfoxide, tetramethylsulfoxide, tetrahydrofuran, dioxane, acetonitrile, chloroform, polarclean solvent, triethyl phosphate, trimethyl phosphate, hexamethylammonium phosphate, tetramethylurea, acetonitrile, toluene, hexane, and octane, etc., the time and temperature for preparing the membrane casting solution depend on the membrane casting materials.

In step 2), it is preferable to evenly coat the membrane casting solution on the bottom layer for blade-coating into a film.

The bottom layer material required for coating with the membrane casting solution may use the support layer material or the substrate material for coating a polymer solution in the prior art, which may include, but not limited to, porous support materials such as nonwoven fabrics, woven fabrics, polyester screens, and electrospun films.

In step 2), a wet film is coated with the membrane casting solution, with no particular thickness limitations, and the blade-coated film has a thickness of preferably 50-500 μm, more preferably 75-300 μm.

In step 3), the atomization pretreatment involves, after coating the bottom layer with the membrane casting solution, facing one side of the bottom layer uncoated with the membrane casting solution towards the atomized droplets, staying in an atomized droplet bath for contact for a certain period of time, and protecting another side coated with the membrane casting solution from contacting with the atomized droplets.

There is no particular limitation to the method of obtaining the atomized droplet bath, and various conventional liquid atomization methods, such as pressure atomization, rotary disc atomization, high-pressure airflow atomization, ultrasonic atomization, etc, can be used.

The atomization pretreatment time is preferably 1 s-60 s, more preferably 2 s-40 s.

The size of the droplets in the droplet bath is preferably 1-50 μm, more preferably 3-30 μm.

The required atomization amount per unit membrane area is 2.5-20 $L/m^2 \cdot h$, preferably 10-17 $L/m^2 \cdot h$.

The droplets in the atomization pretreatment are a poor solvent for the membrane casting polymer, which may be at least one of the components such as water, ethanol, ethylene glycol, may consist of water and a polar non-proton solvent, a surfactant, or other solvents, and may also be a solution of salt, acid, or alkali.

For the method of protecting the side coated with the membrane casting solution from contacting with the atomized droplets, a shielding protection, a blowing protection, etc. can be adopted.

The coagulation bath in step 4) is a poor solvent for the membrane casting polymer, which may be at least one of the components such as water, ethanol, ethylene glycol, and may also be a mixture of water and a polar non-proton solvent or other solvents, such as sodium hydroxide aqueous solution.

The present invention also provides a method for preparing a composite nanofiltration membrane. For example, this method includes:

preparing an ultrafiltration membrane according to the method for preparing an ultrafiltration membrane according to the present invention;

using the polymer layer of the ultrafiltration membrane as a porous support layer, bringing the porous support layer sequentially into contact with an aqueous phase solution containing an aliphatic multifunctional amine compound and an organic phase solution containing an aromatic multifunctional acyl chloride compound; and performing drying and heat treatment to obtain the composite nanofiltration membrane.

Hence, according to one preferable embodiment of the present invention, the preparation method for the composite nanofiltration membrane include the following steps:

1) dissolving components containing a polymer of a porous support layer in a solvent to prepare a membrane casting solution;
2) blade-coating the membrane casting solution on a bottom layer;
3) performing an atomization pretreatment which is staying in an atomized droplet bath, wherein one side of the bottom layer uncoated with the membrane casting solution is faced towards atomized droplets and another side coated with the membrane casting solution is protected from contacting with the atomized droplets;
4) immersing in a coagulation bath to obtain a porous support layer with the bottom layer;
5) sequentially contacting the porous support layer with the bottom layer with an aqueous phase solution containing an aliphatic multifunctional amine compound and an organic phase solution containing an aromatic multifunctional acyl chloride compound;
6) performing drying and heat treatment to obtain the composite nanofiltration membrane.

In other words, the method for preparing the composite nanofiltration membrane according to the present invention may comprise the following steps:

1) dissolving components containing a polymer in a solvent to prepare a membrane casting solution;

2) blade-coating the membrane casting solution into a film on a bottom layer to form the bottom layer coated with the membrane casting solution;
3) performing an atomization pretreatment on the bottom layer coated with the membrane casting solution, including staying in a droplet bath, wherein one side of the bottom layer coated with the membrane casting solution is protected from contacting with atomized droplets, and another of the bottom layer uncoated with the membrane casting solution is faced towards the atomized droplets to obtain an atomization pretreated membrane;
4) immersing the atomization pretreated membrane in a coagulation bath to obtain a porous support layer with the bottom layer.
5) sequentially contacting the porous support layer with the bottom layer with an aqueous phase solution containing an aliphatic multifunctional amine compound and an organic phase solution containing an aromatic multifunctional acyl chloride compound; and
6) performing drying and heat treatment to obtain the composite nanofiltration membrane.

The present invention also provides a method for preparing a composite forward osmosis membrane. For example, this method includes:

preparing an ultrafiltration membrane according to the method for preparing an ultrafiltration membrane according to the present invention;

using the polymer layer of the ultrafiltration membrane as a porous support layer, bringing the porous support layer sequentially into contact with an aqueous phase solution containing an aromatic multifunctional amine compound and an organic phase solution containing an aromatic multifunctional acyl chloride compound; and performing drying and heat treatment to obtain the composite forward osmosis membrane.

Hence, according to one preferable embodiment of the present invention, the preparation method for the composite forward osmosis membrane includes the following steps:
1) dissolving components containing a polymer of a porous support layer in a solvent to prepare a membrane casting solution;
2) blade-coating the membrane casting solution on a bottom layer;
3) performing an atomization pretreatment which is staying in an atomized droplet bath, wherein one side of the bottom layer uncoated with the membrane casting solution is faced towards atomized droplets, and another side coated with the membrane casting solution is protected from contacting with the atomized droplets;
4) immersing in a coagulation bath to obtain the porous support layer with the bottom layer;
5) sequentially contacting the porous support layer with the bottom layer with an aqueous phase solution containing an aromatic multifunctional amine compound and an organic phase solution containing an aromatic multifunctional acyl chloride compound;
6) performing drying and heat treatment to obtain the composite forward osmosis membrane.

In other words, the method for preparing the composite forward osmosis membrane according to the present invention may comprise the following steps:
1) dissolving components containing a polymer in a solvent to prepare a membrane casting solution;
2) blade-coating the membrane casting solution into a film on a bottom layer to form the bottom layer coated with the membrane casting solution;
3) performing an atomization pretreatment on the bottom layer coated with the membrane casting solution, including staying in a droplet bath, wherein one side of the bottom layer coated with the membrane casting solution is protected from contacting with atomized droplets, and another side of the bottom layer uncoated with the membrane casting solution is faced towards the atomized droplets to obtain an atomization pretreated membrane;
4) immersing the atomization pretreated membrane in a coagulation bath to obtain a porous support layer with the bottom layer;
5) sequentially contacting the porous support layer with the bottom layer with an aqueous phase solution containing an aromatic multifunctional amine compound and an organic phase solution containing an aromatic multifunctional acyl chloride compound; and
6) performing drying and heat treatment to obtain the composite forward osmosis membrane.

A further object of the present invention is to provide a polymer ultrafiltration membrane obtained by the preparation method, a composite nanofiltration membrane obtained by the preparation method, and/or a composite forward osmosis membrane obtained by the preparation method.

A further object of the present invention is to provide applications of the polymer ultrafiltration membrane or the polymer ultrafiltration membrane obtained by the preparation method in fields such as water treatment, biology, medicine, energy, etc.

Compared with the prior art, the present invention is characterized in that:

the ultrafiltration membrane prepared according to the method disclosed in the present invention has a special structure, and has a separation surface layer of small pores with a narrow pore size distribution and a sublayer of a bicontinuous highly interconnected porous structure. The sublayer has a relatively large porosity, can effectively reduce the mass transferring resistance of the ultrafiltration membrane, and significantly improve the permeation flux of the membrane while maintaining a high rejection rate. The present invention only requires the addition of an atomization pretreatment process on the basis of the preparation process of the traditional non-solvent induced phase conversion method. It has characteristics of simple preparation process, easy availability of raw materials, and low cost, and can be used for a continuous large-scale preparation of separation membrane materials. It is easy to industrialize and has a wide range of applications in fields such as water treatment, biology, medicine, energy, with good application prospects.

SPECIFIC EMBODIMENTS

Figure 1A:
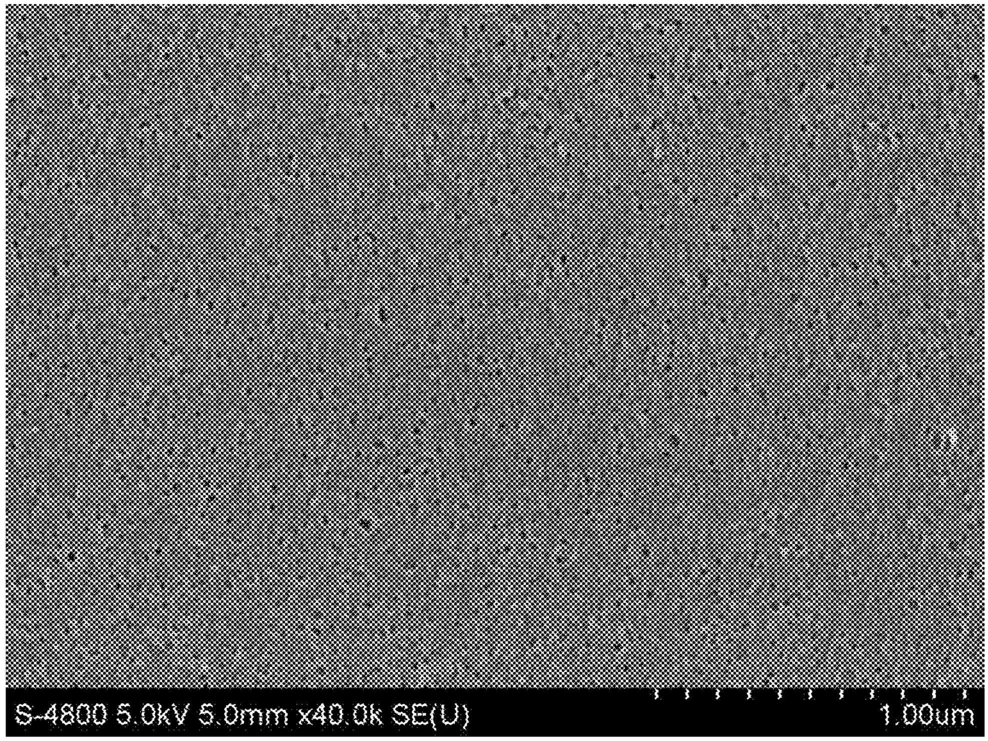
FIG. 1A is a surface morphological image of the ultrafiltration membrane of Example I-3.

The present invention is described specifically with specific Examples as follows. It is necessary to point out that the following Examples only serve for further explanation of the present invention and cannot be understood as a limitation of the protection scope of the present invention. Some non-essential improvements and adjustments of the present invention made by those skilled in the art based on the contents of the present invention still fall within the protection scope of the present invention.

In addition, it should be explained that each specific technical feature described in the following specific embodiments can be combined in any suitable way without causing contradiction. In order to avoid unnecessary repetition, various possible manners of combinations would not be explained separately in the present invention.

In addition, various different embodiments of the present invention can also be combined arbitrarily, as long as they do not go against the ideas of the present invention, and the technical solutions formed thereby belong to a part of the initial disclosure of the present description and also fall within the protection scope of the present invention at the same time.

In the following Examples, the present application provides a high-performance ultrafiltration membrane, which is formed by subjecting the polymer to an atomization pretreatment in combination with a non-solvent induced phase separation, wherein the polymer layer of the ultrafiltration membrane is divided into a sublayer and a surface layer, the sublayer is of a highly interconnected bicontinuous porous structure which consists of a three-dimensional random skeleton.

As mentioned earlier, the rejection rate is another important indicator that characterizes the performance of the ultrafiltration membrane. The rejection rate of the ultrafiltration membrane towards the substance is required to be 90% or more. Under an operating pressure of 0.1 MPa, by using a 0.1 $g \cdot L^{-1}$ bovine serum albumin (BSA) phosphate buffer aqueous solution at 25° C. as a test solution, a BSA rejection rate test was carried out on the self-made ultrafiltration membranes. The molecular weight of BSA used as the test solution was 67 KDa. During testing, after collecting the filtrate at room temperature, the absorbance value A of the BSA test solution and the filtrate was measured by using an ultraviolet grating spectrophotometer at a wavelength of 280 nm. The rejection rate of the ultrafiltration membrane towards BSA was calculated according to formula (2).

$$R = \left[1 - \left(\frac{C_P}{C_J}\right)\right] \times 100\% = \left[1 - \left(\frac{A_P}{A_J}\right)\right] \times 100\%, \quad (2)$$

In formula (2), R represents the rejection rate of BSA; $C_p$ represents the concentration of the filtrate; $C_j$ represents the concentration of the test solution; $A_p$ represents the absorbance of the filtrate; $A_j$ represents the absorbance of the test solution.

With regard to the microscopic morphology of the membrane, the surface and cross-sectional morphologies of the membrane sample were observed by using Hitachi S-4800 high-resolution field emission scanning electron microscopy (FESEM); the mean pore size of the membrane was determined by a liquid-liquid displacement method, wherein when determining the pore size by the method, deionized water and isobutanol were used as a displacing agent and a wetting agent respectively; the cross-sectional porosity of the membrane was obtained by processing and analyzing the SEM morphology of the membrane using Image J software; the bulk porosity of the membrane was determined by using a weighing method, and the bulk porosity of the membrane can be calculated according to formula (3).

$$\varepsilon = 1 - \frac{v_m}{v_t}, \quad (3)$$

In formula (3), $V_m$ is the solid volume of the membrane sample, $V_t$ is the total volume of the membrane sample, $V_m = m/\rho$, m is the weight of the dry membrane, ρ is the density of the membrane material.

Unless otherwise defined, all technical and scientific terms used in the present invention belong to the general definitions in the field of the present application.

Example I

The series of Example I illustrate the ultrafiltration membrane according to the present invention.

In the Examples of the present invention, all the chemical reagents used are commercially available products, without any special purification treatment unless otherwise specified.

Spray equipment: Haoqi HQ-JS130H is selected as an ultrasonic humidifier;

Pore size testing equipment: Nanjing Gaoqian PSDA-20 ultrafiltration membrane pore size analyzer.

Example I-1

12 g of polysulfone was dissolved in 88 g of polarclean solvent, and heated with stirring at 100° C. to form a homogeneous solution (membrane casting solution), which was vacuumized for degassing; then, it was blade-coated on a nonwoven fabric (bottom layer) with a continuous casting machine, with the initial casting height being controlled at 200 μm during coating, followed by facing one side of the coated nonwoven fabric uncoated with the membrane casting solution towards a droplet bath obtained by a deonized water ultrasonic atomization, staying in the droplet bath for 5 s and protecting another side coated with the membrane casting solution from contacting with atomized droplets, with an atomization amount of 6.2 L/m$^2$·h; then the above thin film was immersed in a deionized water coagulation bath for a complete phase separation; after washing with water, an ultrafiltration membrane was obtained.

Therein, the thickness of the nonwoven fabric of the ultrafiltration membrane was 85 μm, the thickness of the sublayer was 45 μm, the thickness of the surface layer was 2.2 μm, the mean pore size of the surface layer is 20 nm.

Example I-2

An ultrafiltration membrane was prepared according to the method in Example I-1, except that the atomization amount of the atomized droplets used in the atomization pretreatment stage was 10 L/m$^2$·h.

Therein, the thickness of the sublayer was 47 μm, the thickness of the surface layer was 1.7 μm, the mean pore size of the surface layer was 21 nm.

Example I-3

An ultrafiltration membrane was prepared according to the method in Example I-1, except that the atomization amount of the atomized droplets used in the atomization pretreatment stage was 17 L/m$^2$·h. See FIG. 1A for the surface morphology.

Therein, the thickness of the sublayer was 50 μm, the thickness of the surface layer was 1.5 μm, the mean pore size of the surface layer was 23 nm.

Example I-4

An ultrafiltration membrane was prepared according to the method in Example I-3, except that in the atomization pretreatment stage, face one side of the coated nonwoven fabric uncoated with the membrane casting solution towards a droplet bath obtained by a deonized water ultrasonic atomization, and stay in the droplet bath for 3 s.

Therein, the thickness of the sublayer was 48 μm, the thickness of the surface layer was 1.6 μm, the mean pore size of the surface layer was 21 nm.

Example I-5

Figure 1B:
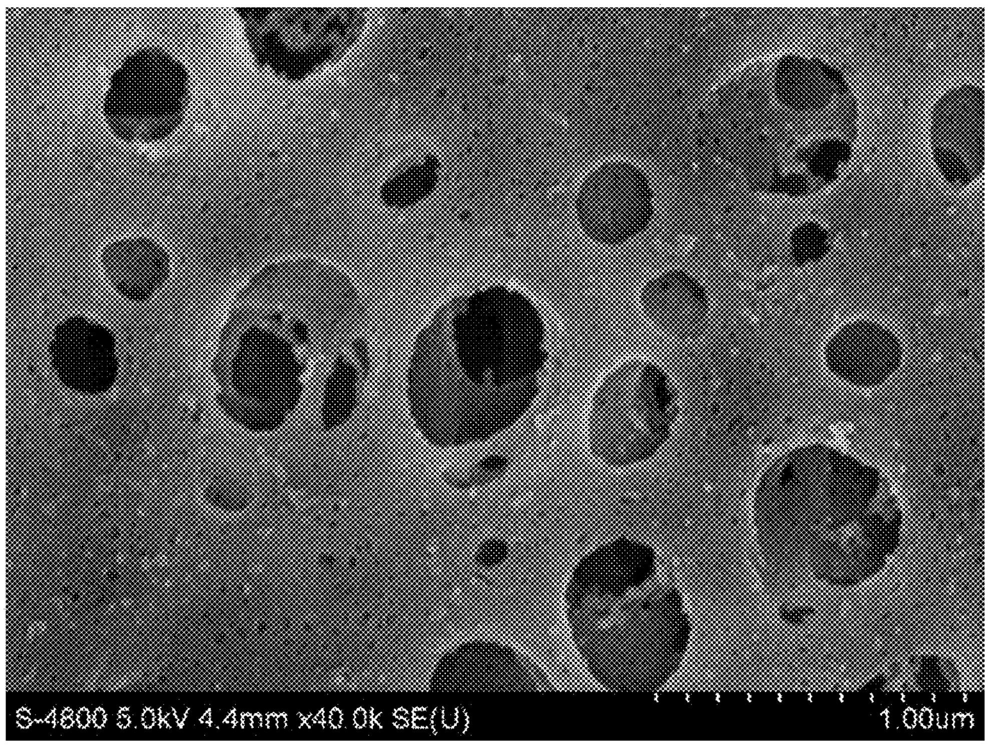
FIG. 1B is a surface morphological image of the ultrafiltration membrane of Example I-5.

A filtration membrane was prepared according to the method in Example I-3, except that in the atomization pretreatment stage, face one side of the coated nonwoven fabric uncoated with the membrane casting solution towards a droplet bath obtained by a deonized water ultrasonic atomization, and stay in the droplet bath for 8 s. See FIG. 1B for the surface morphology of the membrane.

Therein, the thickness of the sublayer was 52 μm, the thickness of the surface layer was 1.2 μm, the mean pore size of the surface layer was 178 nm.

Comparative Example I-1

Figure 1C:
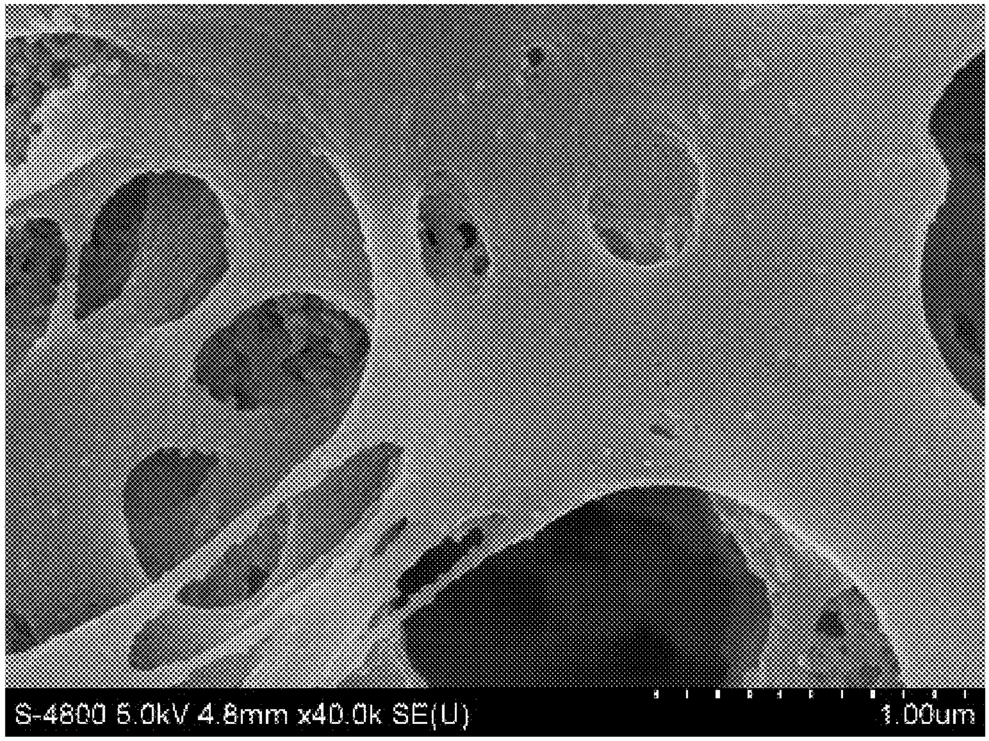
FIG. 1C is a surface morphological image of the ultrafiltration membrane of Comparative Example 1.

A filtration membrane was prepared according to the method in Example I-3, except that during the preparation of the filtration membrane, face one side of the coated nonwoven fabric coated with the membrane casting solution towards a droplet bath obtained by a deonized water ultrasonic atomization, and stay in the droplet bath for 5 s, obtaining a filtration membrane after washing with water. See FIG. 1C for the surface morphology of the membrane.

Therein, the mean pore size of the membrane was 410 nm.

Comparative Example I-2

Figure 1D:
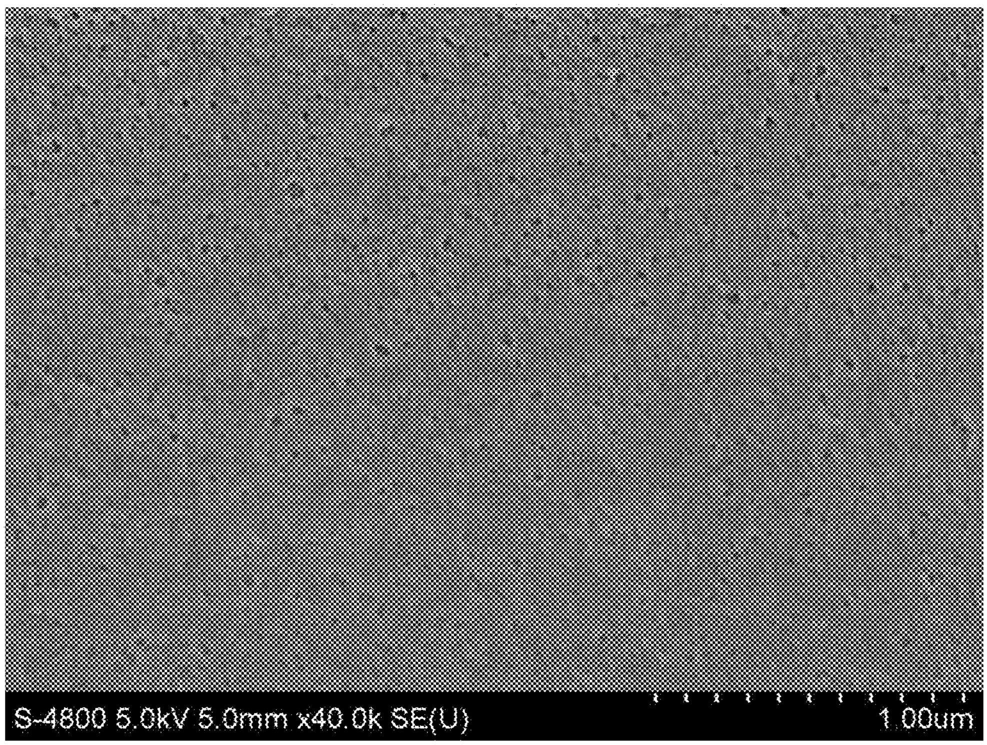
FIG. 1D is a surface morphological image of the ultrafiltration membrane of Comparative Example 2.

An ultrafiltration membrane was prepared according to the method in Example I-1, except that during the preparation of the ultrafiltration membrane, without undergoing an atomization pretreatment stage, directly immerse the coated nonwoven fabric in a deionized water coagulation bath for a complete phase separation, and obtain a filtration membrane after washing with water. See FIG. 1D for the surface morphology of the membrane.

Therein, the mean pore size of the membrane was 17 nm.

Under the test conditions of an operating pressure of 0.1 MPa and a temperature of 25° C., the pure water fluxes of the ultrafiltration membranes prepared in the above Examples I-1 to 5 and Comparative Examples I-1 to 2 were tested with deionized water. Further, under the testing conditions of 0.1 MPa and a temperature of 25° C., the BSA rejection rates of the ultrafiltration 10 membrane prepared in Examples I-1 to 5 and Comparative Examples I-1 to 2 were tested. The results obtained from the tests are shown in Table I-1.

TABLE I-1

| polymer membrane | atomization amount of atomization pretreatment (L/m$^2$ · h) | time of atomization pretreatment (s) | direction of atomization pretreatment | bulk porosity (%) | water flux (L/m$^2$ · h) | BSA rejection rate (%) |
|---|---|---|---|---|---|---|
| Example I-1 | 6.2 | 5 | reverse direction | 68 | 1211 | 97.5 |
| Example I-2 | 10 | 5 | reverse direction | 71 | 1484 | 96.8 |
| Example I-3 | 17 | 5 | reverse direction | 74 | 1684 | 96.3 |
| Example I-4 | 17 | 3 | reverse direction | 70 | 1355 | 97.7 |
| Example I-5 | 17 | 8 | reverse direction | 79 | 1931 | 68.6 |

TABLE I-1-continued

| polymer membrane | atomization amount of atomization pretreatment ($L/m^2 \cdot h$) | time of atomization pretreatment (s) | direction of atomization pretreatment | bulk porosity (%) | water flux ($L/m^2 \cdot h$) | BSA rejection rate (%) |
|---|---|---|---|---|---|---|
| Comparative Example I-1 | 17 | 5 | forward direction | 77 | 2045 | 50.2 |
| Comparative Example I-2 | 0 | 0 | / | 65 | 923 | 98.7 |

As can be seen from Examples I-1 to 3 and Comparative Example I-2, after the atomization pretreatment on the side of the coated nonwoven fabric uncoated with the membrane casting solution, the pure water fluxes of the resulting ultrafiltration membranes are improved significantly and the atomization amount has a great influence on the pure water flux of the membrane which is increased as the atomization amount increases. As can be seen from Examples I-3 to 5 and Comparative Example I-1 to 2, after the atomization pretreatment on the side of the coated nonwoven fabric uncoated with the membrane casting solution, the pure water flux of the membrane is increased as the atomization time increases; when the atomization time is within 5 s, the BSA rejection rate of the membrane remains basically constant; when the atomization time reaches 8 s, the BSA rejection rate of the membrane decreases significantly; after the atomization pretreatment of the side of the coated nonwoven fabric coated with the membrane casting solution, the BSA rejection rate of the membrane is significantly reduced.

In terms of morphology, within 5 s of the pretreatment of the side of the coated nonwoven fabric uncoated with the membrane casting solution facing the atomized droplets, the upper surface of the ultrafiltration membrane presents a uniform small pore structure, the mean pore size distributions on the surfaces of the ultrafiltration membranes without and with the atomization pretreatment are both narrow, and the mean pore sizes remain constant at 20±3 nm. The number of pores on the membrane surface and the membrane bulk porosity increase with the increase of atomization time. As the atomization time further increases (greater than 5 s) and the side of the coated nonwoven fabric coated with the membrane casting solution is faced towards the atomized droplet bath, the upper surfaces of the membranes becomes rougher and presents a large pore structure of micrometer scale.

Example I-6

12 g of polyacrylonitrile was dissolved in 88 g of DMF solvent, and heated with stirring at 50° C. to form a homogeneous solution, which was vacuumized for degassing; then, it was blade-coated on a nonwoven fabric with a continuous casting machine, with the initial casting height being controlled at 200 μm during coating, followed by facing the side of the coated nonwoven fabric uncoated with the membrane casting solution towards a droplet bath obtained by a deonized water ultrasonic atomization, staying in the droplet bath for 10 s and protecting the side of the membrane coated with the membrane casting solution from contacting with atomized droplets, with an atomization amount of 17 $L/m^2 \cdot h$; then the above thin film was immersed in a deionized water coagulation bath for a complete phase separation; after washing with water, an ultrafiltration membrane was obtained.

Therein, the thickness of the sublayer was 45 μm, the thickness of the surface layer was 2.4 μm, the mean pore size of the surface layer was 18 nm; in the thickness direction of the sublayer, 5 arbitrary XY cross-sections perpendicular to the thickness direction were counted, with a cross-sectional porosity of 65-67%, and in the length direction of the sublayer, 10 arbitrary YZ cross-sections perpendicular to the length direction were counted, with a cross-sectional porosity of 67-72%, and in the width direction of the sublayer, 10 arbitrary XZ cross-sections perpendicular to the width direction were counted, with a cross-sectional porosity of 65-71%.

Example I-7

An ultrafiltration membrane was prepared according to the method in Example I-6, except that in the atomization pretreatment stage, face the side of the coated nonwoven fabric uncoated with the membrane casting solution towards a droplet bath obtained by a deonized water ultrasonic atomization, and stay in the droplet bath for 20 s.

Therein, the thickness of the sublayer was 47 μm, the thickness of the surface layer was 1.9 μm, the mean pore size of the surface layer was 20 nm; in the thickness direction of the sublayer, 5 arbitrary XY cross-sections perpendicular to the thickness direction were counted, with a cross-sectional porosity of 68-72%, and in the length direction of the sublayer, 10 arbitrary YZ cross-sections perpendicular to the length direction were counted, with a cross-sectional porosity of 66-75%, and in the width direction of the sublayer, 10 arbitrary XZ cross-sections perpendicular to the width direction were counted, with a cross-sectional porosity of 67-74%.

Example I-8

Figure 1E:
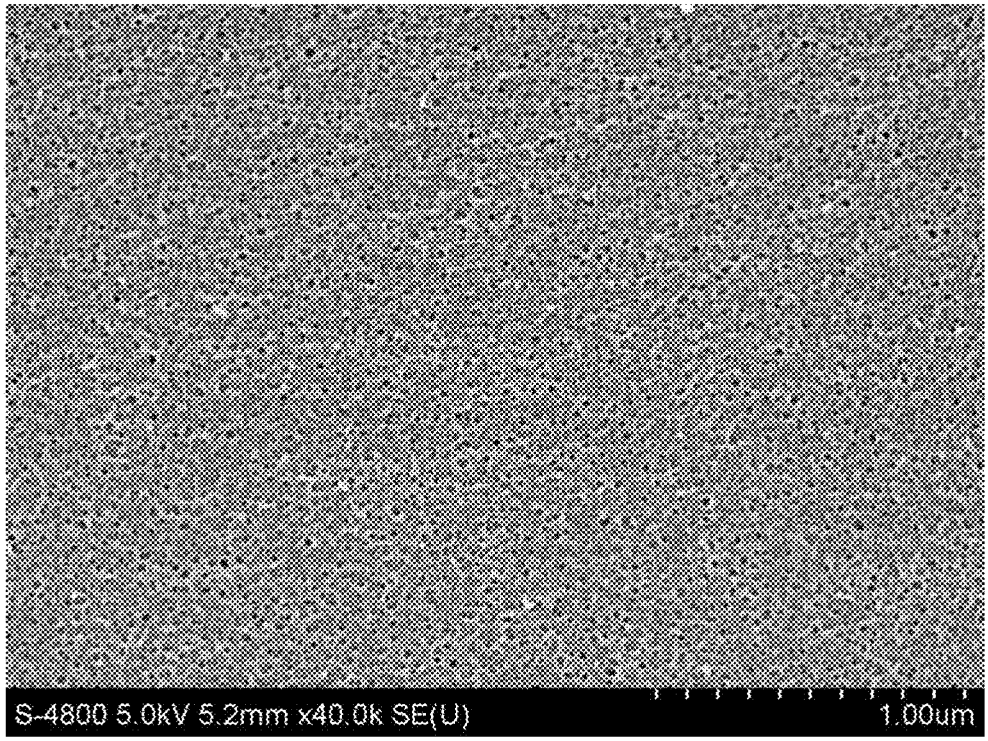
FIG. 1E is a surface morphological image of the ultrafiltration membrane of Example I-8.
Figure 1F:
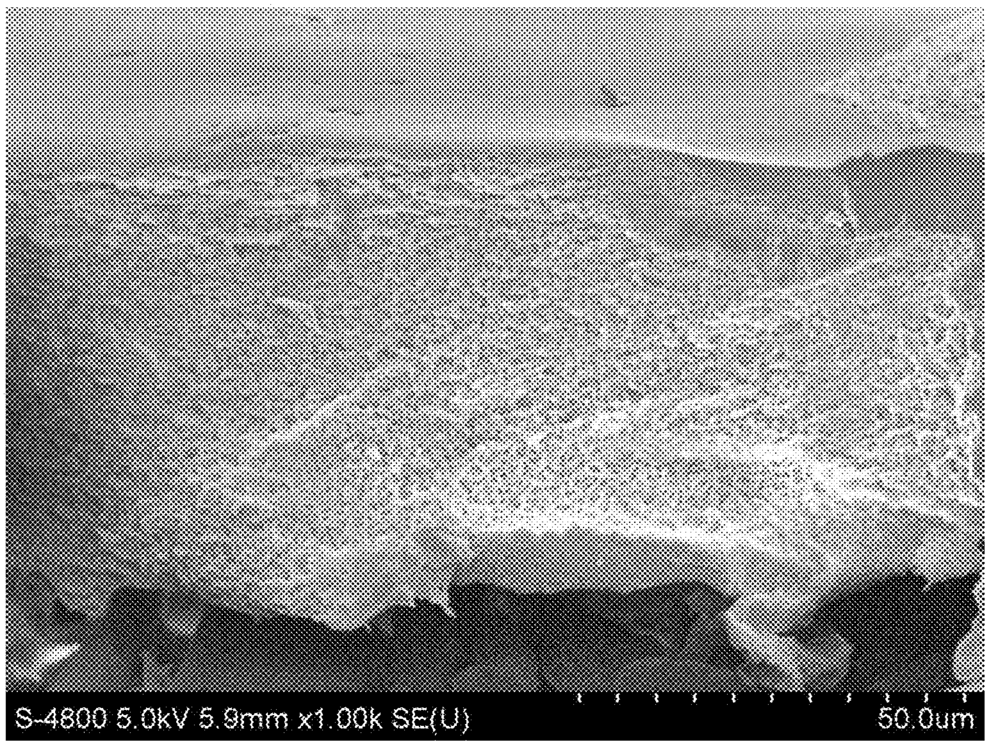
FIG. 1F is a cross-sectional morphological image of the ultrafiltration membrane of Example I-8.
Figure 1G:
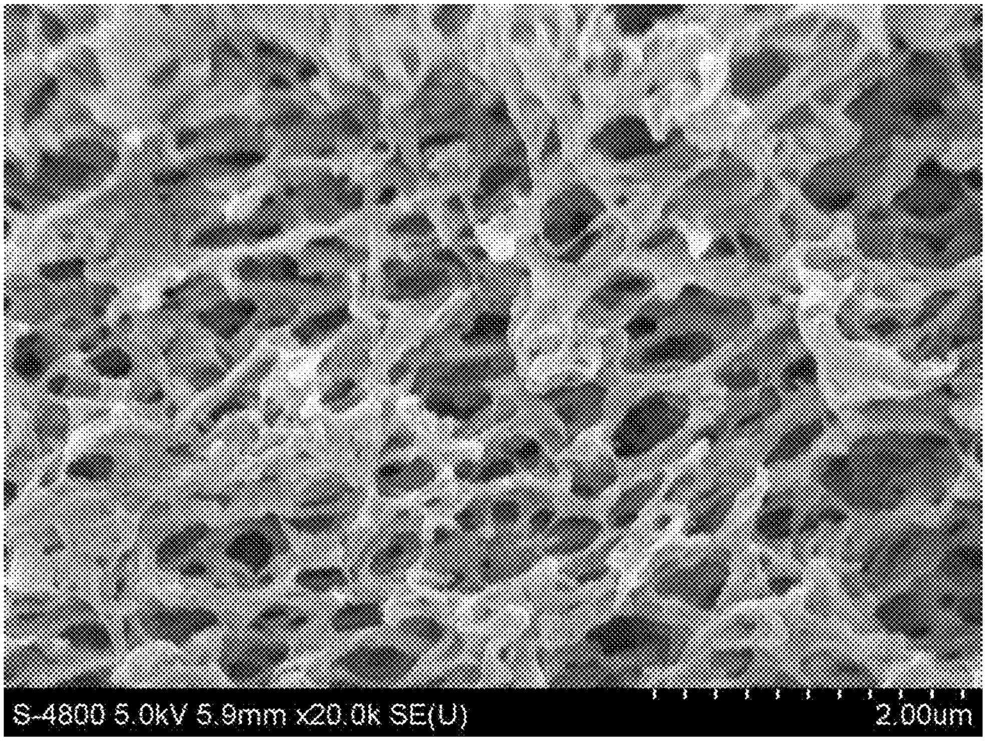
FIG. 1G is a partially enlarged view of FIG. 1F.

An ultrafiltration membrane was prepared according to the method in Example I-6, except that in the atomization pretreatment stage, face the back side of the coated membrane towards a droplet bath obtained by a deonized water ultrasonic atomization, and stay in the droplet bath for 30 s. See FIG. 1E to FIG. 1G for the surface and cross-sectional morphologies.

Therein, the thickness of the sublayer was 50 μm, the thickness of the surface layer was 1.8 μm, the mean pore size of the surface layer was 24 nm; in the thickness direction of the sublayer, 5 arbitrary XY cross-sections perpendicular to the thickness direction were counted, with a cross-sectional porosity of 70-74%, and in the length direction of the sublayer, 10 arbitrary YZ cross-sections perpendicular to the length direction were counted, with a cross-sectional porosity of 69-78%, and in the width direction of the sublayer, 10 arbitrary XZ cross-sections perpendicular to the width direction were counted, with a cross-sectional porosity of 70-76%.

Example I-9

Figure 1H:
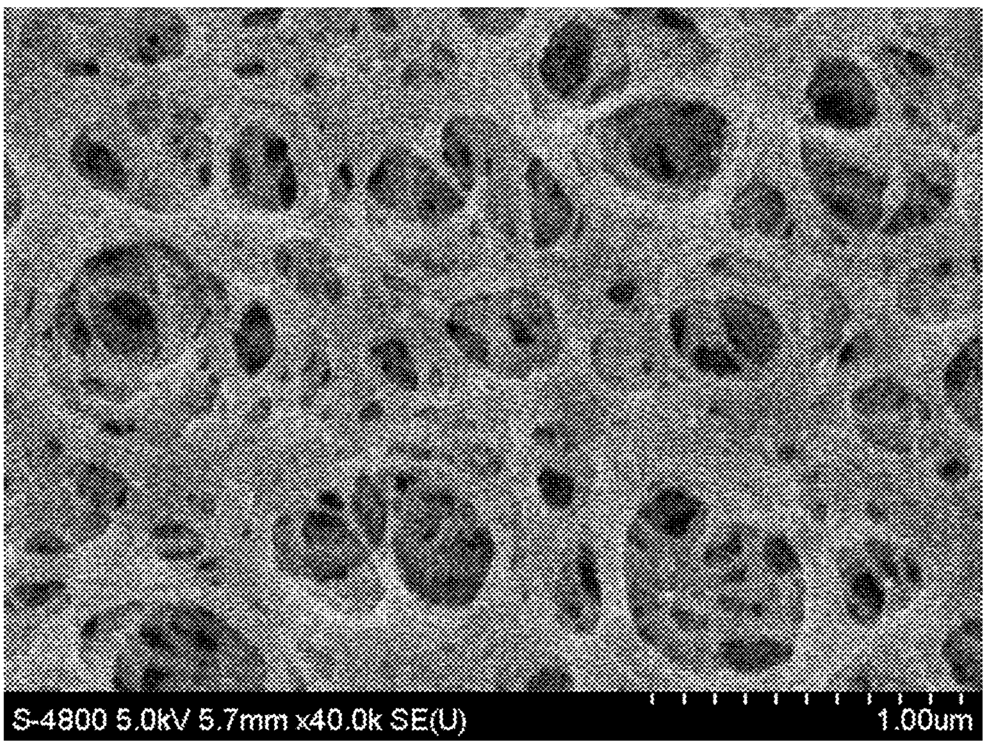
FIG. 1H is a surface morphological image of the ultrafiltration membrane of Example I-9.

An ultrafiltration membrane was prepared according to the method in Example I-6, except that in the atomization pretreatment stage, face the side of the coated nonwoven fabric uncoated with the membrane casting solution towards a droplet bath obtained by a deonized water ultrasonic atomization, and stay in the droplet bath for 40 s. See FIG. 1H for the surface morphology.

Therein, the thickness of the sublayer was 52 μm, the thickness of the surface layer was 1.6 μm, the mean pore size of the surface layer was 62 nm; in the thickness direction of the sublayer, 5 arbitrary XY cross-sections perpendicular to the thickness direction were counted, with a cross-sectional porosity of 71-77%, and in the length direction of the sublayer, 10 arbitrary YZ cross-sections perpendicular to the length direction were counted, with a cross-sectional porosity of 72-79%, and in the width direction of the sublayer, 10 arbitrary XZ cross-sections perpendicular to the width direction were counted, with a cross-sectional porosity of 74-78%.

Example I-10

Figure 1I:
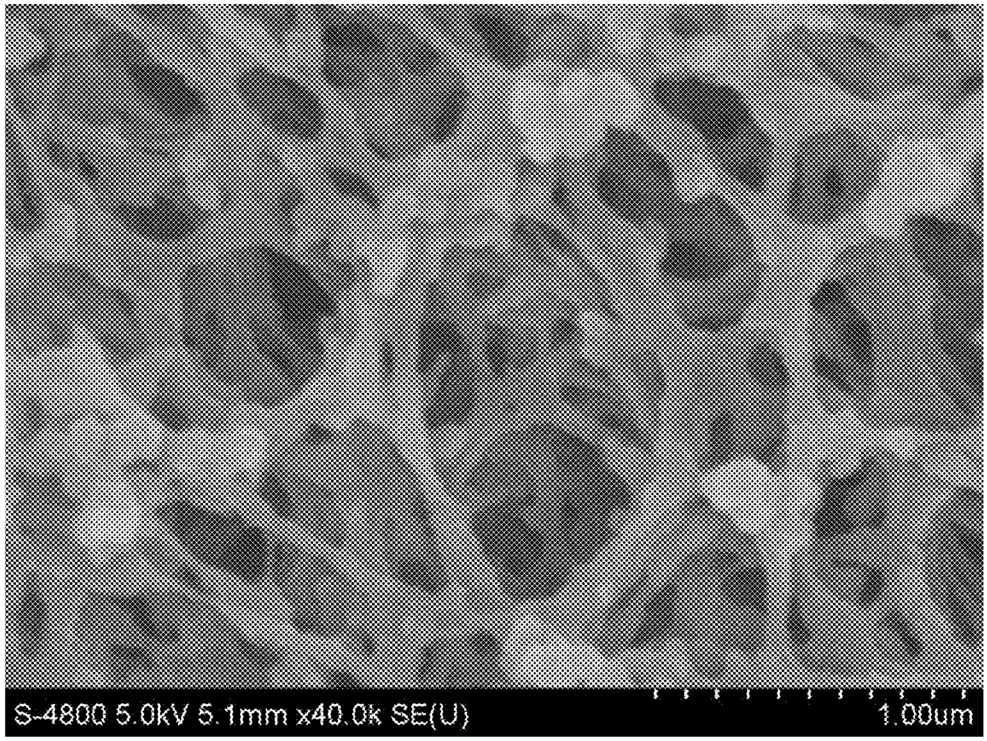
FIG. 1I is a surface morphological image of the ultrafiltration membrane of Example I-10.

A filtration membrane was prepared according to the method in Example I-6, except that in the atomization pretreatment stage, face the side of the coated nonwoven fabric uncoated with the membrane casting solution towards a droplet bath obtained by a deonized water ultrasonic atomization, and stay in the droplet bath for 50 s. See FIG. 1I for the surface morphology.

Therein, the thickness of the sublayer was 55 μm, the thickness of the surface layer was 1.5 μm, the mean pore size of the surface layer was 254 nm; in the thickness direction of the sublayer, 5 arbitrary XY cross-sections perpendicular to the thickness direction were counted, with a cross-sectional porosity of 75-83%, and in the length direction of the sublayer, 10 arbitrary YZ cross-sections perpendicular to the length direction were counted, with a cross-sectional porosity of 75-80%, and in the width direction of the sublayer, 10 arbitrary XZ cross-sections perpendicular to the width direction were counted, with a cross-sectional porosity of 76-81%.

Example I-11

An ultrafiltration membrane was prepared according to the method in Example I-8, except that during the formulation of a membrane casting solution, the addition amount of PAN in a system of membrane casting solution was 14%.

Therein, the thickness of the sublayer was 53 μm, the thickness of the surface layer was 2.1 μm, the mean pore size of the surface layer was 17 nm.

Example I-12

An ultrafiltration membrane was prepared according to the method in Example I-8, except that during the formulation of a membrane casting solution, 0.5% of a polymer additive of polyvinylpyrrolidone, with a molecular weight of 58000 Da, was added to a system of membrane casting solution.

Therein, the thickness of the sublayer was 51 μm, the thickness of the surface layer was 1.5 μm, the mean pore size of the surface layer was 22 nm.

Comparative Example I-3

Figure 1J:
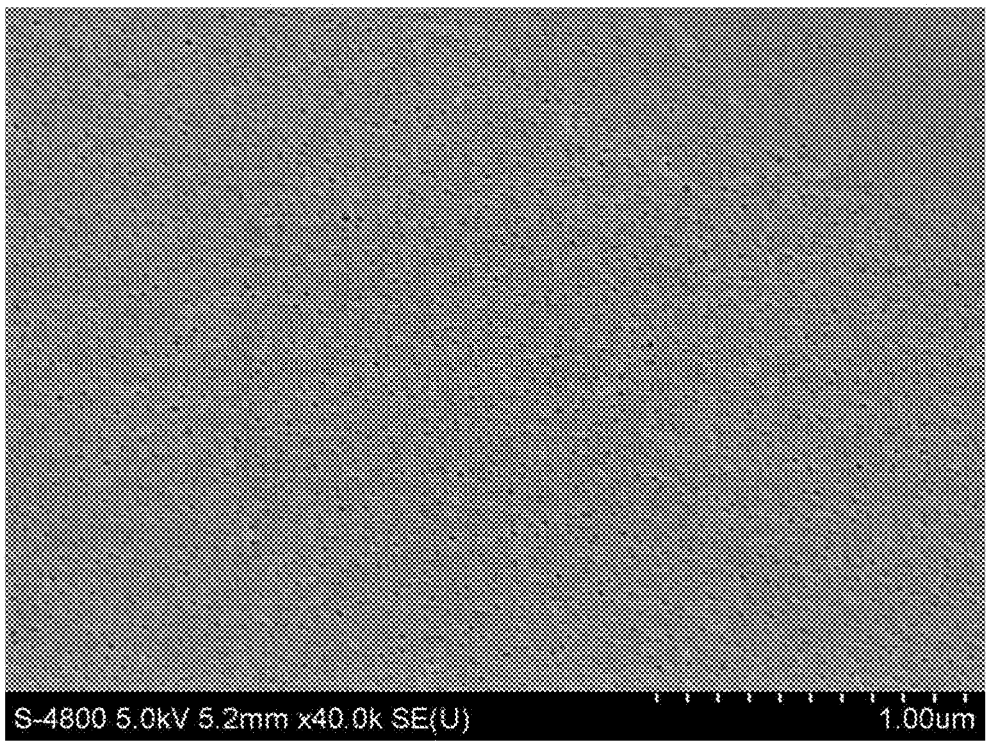
FIG. 1J is a surface morphological image of the ultrafiltration membrane of Comparative Example I-3.
Figure 1K:
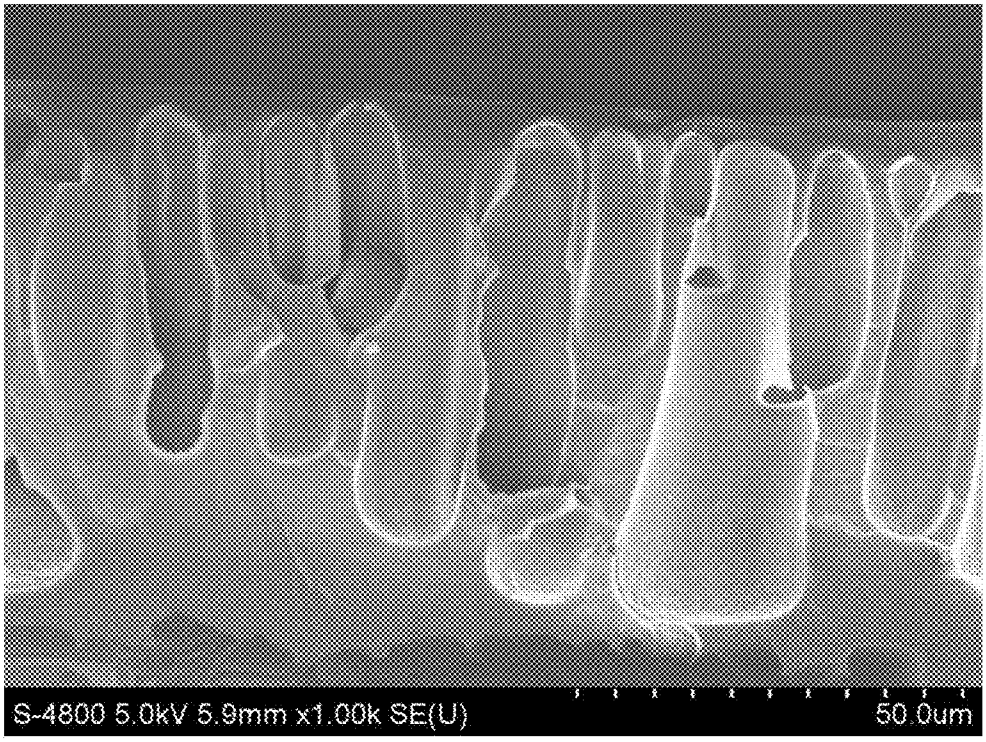
FIG. 1K is a cross-sectional morphological image of the ultrafiltration membrane of Comparative Example I-3.

An ultrafiltration membrane was prepared according to the method in Example I-6, except that during the preparation of the ultrafiltration membrane, without undergoing an atomization pretreatment stage, directly immerse the ultrafiltration membrane in a solvent coagulation bath for a complete phase separation, and obtain an ultrafiltration membrane after washing with water. See FIG. 1J to FIG. 1K for the surface and the cross-sectional morphologies of the membrane.

Therein, the mean pore size of the membrane was 17 nm; in the thickness direction of the sublayer, 5 arbitrary XY cross-sections perpendicular to the thickness direction were counted, with a cross-sectional porosity of 58-62%, and in the length direction of the sublayer, 10 arbitrary YZ cross-sections perpendicular to the length direction were counted, with a cross-sectional porosity of 62-66%, and in the width direction of the sublayer, 10 arbitrary XZ cross-sections perpendicular to the width direction were counted, with a cross-sectional porosity of 61-66%.

Comparative Example I-4

An ultrafiltration membrane was prepared according to the method in Example I-11, except that during the preparation of the ultrafiltration membrane, without undergoing an atomization pretreatment stage, directly immerse the coated membrane in a deionized water coagulation bath for a complete phase separation, and obtain an ultrafiltration membrane after washing with water.

Therein, the mean pore size of the membrane was 15 nm.

Comparative Example I-5

An ultrafiltration membrane was prepared according to the method in Example I-12, except that during the preparation of the ultrafiltration membrane, without undergoing an atomization pretreatment stage, directly immerse the coated membrane in a solvent coagulation bath for a complete phase separation, and obtain an ultrafiltration membrane after washing with water.

Therein, the mean pore size of the membrane was 21 nm.

Under the test conditions of an operating pressure of 0.1 MPa and a temperature of 25° C., the pure water fluxes of the ultrafiltration membranes prepared in the above Examples I-6 to 12 and Comparative Examples I-3 to 5 were tested with deionized water. Under the testing conditions of 0.1 MPa and a temperature of 25° C., the BSA rejection rates of the ultrafiltration membranes prepared in the above Examples I-6 to 12 and Comparative Examples I-3 to 5 were tested. The results obtained from the tests are shown in Table I-2.

TABLE I-2

| polymer membrane | PAN content in membrane casting solution (wt %) | PVP content in membrane casting solution (wt %) | atomization amount of atomization pretreatment (L/m² · h) | time of atomization pretreatment (s) | bulk porosity (%) | water flux (L/m² · h) | BSA rejection rate (%) |
|---|---|---|---|---|---|---|---|
| Example I-6 | 12 | 0 | 17 | 10 | 75 | 342 | 97.6 |
| Example I-7 | 12 | 0 | 17 | 20 | 77 | 389 | 97.4 |
| Example I-8 | 12 | 0 | 17 | 30 | 80 | 439 | 94.6 |
| Example I-9 | 12 | 0 | 17 | 40 | 84 | 578 | 80.5 |
| Example I-10 | 12 | 0 | 17 | 50 | 88 | 1016 | 69.6 |
| Example I-11 | 14 | 0 | 17 | 30 | 76 | 297 | 96.1 |
| Example I-12 | 12 | 0.5 | 17 | 30 | 81 | 644 | 94.2 |
| Comparative Example I-3 | 12 | 0 | 0 | 0 | 73 | 209 | 98.2 |
| Comparative Example I-4 | 14 | 0 | 0 | 0 | 70 | 141 | 98.5 |
| Comparative Example I-5 | 12 | 0.5 | 0 | 0 | 72 | 312 | 97.8 |

As can be seen from Examples I-6 to 10 and Comparative Example I-3, after the pretreatment of the side of the coated nonwoven fabric uncoated with the membrane casting solution facing the atomized droplets, the pure water flux of the resulting ultrafiltration membrane is increased as the atomization time increases; within 0 to 40 s of the atomization time, the BSA rejection rate of the ultrafiltration membrane remains basically constant while when the atomization time reaches and exceeds 40 s, the rejection rate of the membrane decrease significantly.

In terms of morphology, within 0 to 40 s of the atomization time, the upper surface of the ultrafiltration membrane presents a uniform small pore structure, the mean pore size distributions on the surface of the ultrafiltration membranes without and with the atomization pretreatment are both narrow with 20±3 nm. The number of pores on the ultrafiltration membrane surface and the bulk porosity increase with the increase of the atomization time. Compared with the ultrafiltration membrane without an atomization pretreatment, the atomization pretreated ultrafiltration membrane has a significant difference in the cross-sectional morphology, presenting a uniform bicontinuous highly interconnected three-dimensional porous structure, while the cross-section of the ultrafiltration membrane without atomization is of the traditional finger-shaped large pore and sponge pore structure; when the atomization time reaches and exceeds 40 s, the membrane tends to form a microfiltration membrane with the rough large pores on the surface and the bicontinuous highly interconnected porous structure in the cross-section.

From Examples I-11 to 12 and Comparative Examples I-4 to 5, it can be seen that the influence of the atomization pretreatment on the membrane structure and the performance is also applicable to ultrafiltration membranes prepared by increasing the solid content of the membrane casting solution and using an additive.

Example II

The series of Example II illustrate the composite nanofiltration membrane according to the present invention.

According to one preferable embodiment II of the present invention, the preparation method of the composite nanofiltration membrane can be carried out according to the following steps:

1') dissolving components containing a polymer in a solvent to prepare a membrane casting solution;

2') blade-coating the membrane casting solution into a film on a bottom layer;

3') performing an atomization pretreatment, i.e. staying in an atomized droplet bath for a certain period of time, wherein one side of the bottom layer uncoated with the membrane casting solution is faced towards atomized droplets, and another side coated with the membrane casting solution is protected from contacting with the atomized droplets;

4') immersing in a coagulation bath to obtain a polymer porous support layer with the bottom layer;

5') sequentially contacting the porous support layer with the bottom layer with an aqueous phase solution of an aliphatic compounds containing two or more amino groups after dilution for 5 to 150 s;

6') rolling the porous support layer with the bottom layer after immersion in the aqueous phase solution with a rubber roller to remove the excess aqueous phase solution;

7') contacting the porous support layer with the bottom layer from which the excess aqueous phase solution is removed with an organic phase solution of an acyl chloride compound containing two or more acyl chloride groups for 5 to 150 s, and generating a dense functional layer on the surface of the porous support layer through an interfacial polymerization reaction;

8') finally, after naturally drying in air, treating the above resulting primary membrane for 1-5 min at a certain temperature; after washing with water, the nanofiltration composite membrane of the present invention is obtained In the following Examples and Comparative Examples:

(1) the water flux of the composite nanofiltration membrane is measured by the following method: loading the composite nanofiltration membrane into a cross-flow filtration system, pre-pressing at 0.5 MPa for 0.5 h, and measuring the water permeation amount of the composite nanofiltration membrane within 1 h under conditions of a pressure of 0.5 MPa and a temperature of 25° C., and calculating according to the following formula:

$$J=Q/A\cdot t,$$

wherein, J is water flux, Q is water permeation amount (L), A is an effective membrane area of the composite nanofiltration membrane ($m^2$), and t is the time (h);

(2) the desalination rate of the composite nanofiltration membrane is measured by the following method: loading the composite nanofiltration membrane into a cross-flow filtration system, pre-pressing at 0.5 MPa for 0.5 h, and measuring the concentration change of $MgSO_4$ in a primary aqueous solution having an initial concentration of 2 $g \cdot L^{-1}$ $MgSO_4$ and in a permeate within 1 h under the conditions of a pressure of 0.5 MPa and a temperature of 25° C., and calculating according to the following formula:

$$R=(C_p-C_f)/C_p \times 100\%,$$

wherein, R is the desalination rate (%), $C_p$ is the concentration (g/L or mol/L) of $MgSO_4$ in the primary solution, and $C_f$ is the concentration (g/L or mol/L) of $MgSO_4$ in the permeate;

In the Examples of the present invention, all the chemical reagents used are commercially available products without special purification treatment, unless otherwise specified.

Spray equipment: Haoqi HQ-JS130H is selected as ultrasonic humidifier.

Example II-1

(1) Preparation of a porous support layer with a bottom layer: 12 g of polyacrylonitrile was dissolved in 88 g of DMF solvent, and heated with stirring at 50° C. to form a homogeneous solution (membrane casting solution), which was vacuumized for degassing; then, it was blade-coated on a nonwoven fabric (bottom layer) with a continuous casting machine, with the initial casting height being controlled at 200 μm during coating, followed by facing one side of the coated nonwoven fabric uncoated with the membrane casting solution towards a droplet bath obtained by a deonized water ultrasonic atomization, staying in the droplet bath for 20 s and protecting another side coated with the membrane casting solution from contacting with atomized droplets, with an atomization amount of 6.2 $L/m^2 \cdot h$ per unit membrane area; then the above thin film was immersed in a deionized water coagulation bath for a complete phase separation; after washing with water, a porous support layer with a bottom layer was obtained.

(2) Preparation of a composite membrane: a certain amount of an aqueous phase monomer piperazine (PIP) was weighed out into a volumetric flask, brought to the graduation with deionized water for a constant volume, and dissolved under ultrasound to form a homogeneous aqueous phase solution containing 0.5w/v % PIP. A certain amount of an organic phase monomer trimesoyl chloride (TMC) was weighed out into a volumetric flask, brought to the graduation with ISOPAR solvent oil for a constant volume, and dissolved under ultrasound to form a homogeneous organic phase solution containing 0.1w/v % TMC. The polyacrylonitrile porous support membrane prepared in step (1) was used for immersion in and contact with the above aqueous phase solution for 30 s. Afterwards, the excess aqueous phase solution was poured out, the surface of the membrane was dried by rolling with a clean rubber roller, and then the membrane was immersed in and brought into contact with an organic phase solution of trimesoyl chloride for 30 s. Afterwards, the excess organic phase solution was poured out, and the formed polyamide layer was dried in air. After treatment at room temperature for 4 min, a composite nanofiltration membrane was obtained. The prepared composite nanofiltration membrane was stored in deionized water for use in testing.

In the composite nanofiltration membrane obtained from Example II-1, the thickness of the bottom layer was 85 μm, the thickness of the sublayer of the porous support layer was 44 μm, the thickness of the surface layer of the porous support layer was 2.1 μm, the thickness of the active separation layer was 46 nm, the mean pore size of the surface layer of the support layer was 17 nm.

Example II-2

A nanofiltration membrane was prepared according to the method in Example II-1, except that the atomization amount of the atomized droplets used in the atomization pretreatment stage was 10 $L/m^2 \cdot h$ during the preparation of a porous support layer with a bottom layer in the nanofiltration membrane in step (1).

In the composite nanofiltration membrane obtained in Example II-2, the thickness of the bottom layer was 85 μm, the thickness of the sublayer of the porous support layer was 45 μm, the thickness of the surface layer of the porous support layer was 2.0 μm, the thickness of the active separation layer was 43 nm. The mean pore size of the surface layer of the support layer was 18 nm.

Example II-3

Figure 2A:
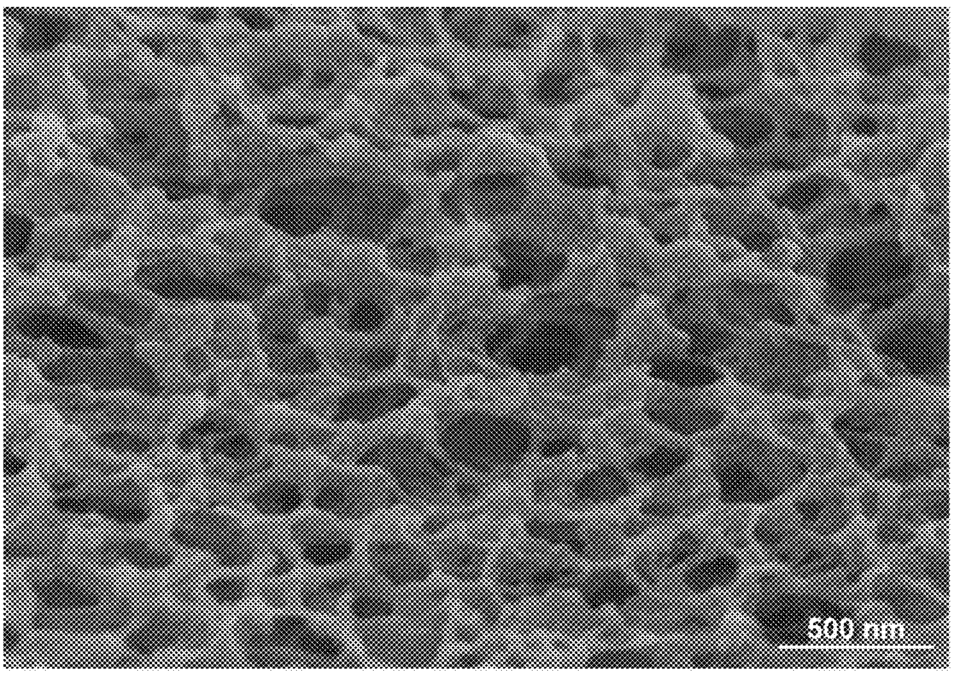
FIG. 2A is a cross-sectional morphological image of the porous support layer of the nanofiltration membrane obtained in Example II-3.
Figure 2B:
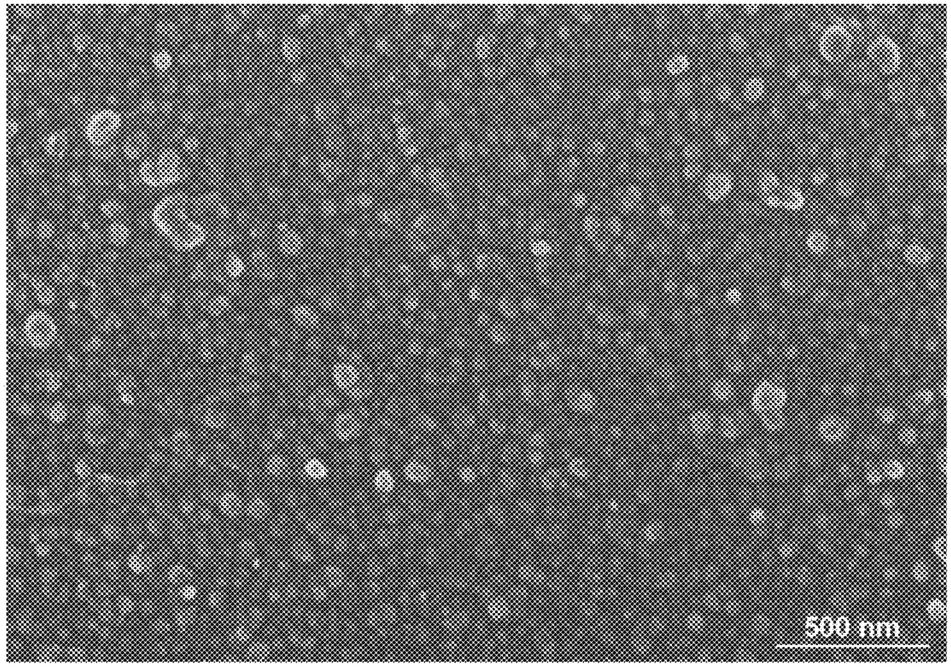
FIG. 2B is a surface morphological image of the nanofiltration membrane obtained in Example II-3.

A nanofiltration membrane was prepared according to the method in Example II-1, except that the atomization amount of the atomized droplets used in the atomization pretreatment stage was 17 $L/m^2 \cdot h$ during the preparation of a porous support layer with a bottom layer in the nanofiltration membrane in step (1). See FIG. 2A for the cross-sectional morphology of the porous support layer of the nanofiltration membrane. See FIG. 2B for the surface morphology of the nanofiltration membrane.

In the composite nanofiltration membrane obtained in Example II-3, the thickness of the bottom layer was 85 μm, the thickness of the sublayer of the porous support layer was 43 μm, the thickness of the surface layer of the porous support layer was 1.9 μm, the thickness of the active separation layer was 43 nm. The mean pore size of the surface layer of the support layer is 19 nm.

Example II-4

A nanofiltration membrane was prepared according to the method in Example II-3, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 10 s.

In the composite nanofiltration membrane obtained in Example II-4, the thickness of the bottom layer was 85 μm, the thickness of the sublayer of the porous support layer was 44 μm, the thickness of the surface layer of the porous support layer was 2.2 μm, the thickness of the active separation layer was 45 nm. The mean pore size of the surface layer of the support layer was 17 nm.

Example II-5

A nanofiltration membrane was prepared according to the method in Example II-3, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 30 s.

In the composite nanofiltration membrane obtained in Example II-5, the thickness of the bottom layer was 85 μm, the thickness of the sublayer of the porous support layer was 48 μm, the thickness of the surface layer of the porous support layer was 1.7 μm, the thickness of the active separation layer was 41 nm. The mean pore size of the surface layer of the support layer was 23 nm.

Example II-6

A nanofiltration membrane was prepared according to the method in Example II-3, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 40 s.

In the composite nanofiltration membrane obtained in Example II-6, the thickness of the bottom layer was 85 μm, the thickness of the sublayer of the porous support layer was 51 μm, the thickness of the surface layer of the porous support layer was 1.7 μm, the thickness of the active separation layer was 38 nm. The mean pore size of the surface layer of the support layer was 57 nm.

Example II-7

A nanofiltration membrane was prepared according to the method in Example II-3, except that during the preparation of a porous support layer with a bottom layer in the nanofiltration membrane in step (1), in the atomization pretreatment stage, facing the side of the coated nonwoven fabric uncoated with the membrane casting solution towards a droplet bath obtained by a deonized water ultrasonic atomization, staying in the droplet bath for 50 s.

In the composite nanofiltration membrane obtained in Example II-7, the thickness of the bottom layer was 85 μm, the thickness of the sublayer of the porous support layer was 54 μm, the thickness of the surface layer of the porous support layer was 1.5 μm, the thickness of the active separation layer was 36 nm. The mean pore size of the surface layer of the support layer was 223 nm.

Comparative Example II-1

Figure 2C:
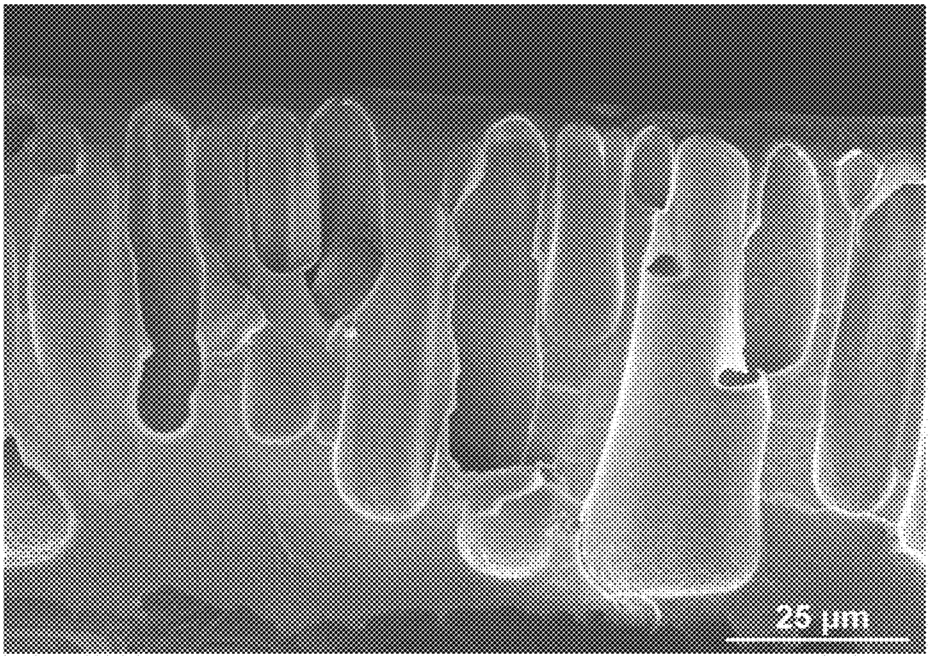
FIG. 2C is a cross-sectional morphological image of the porous support layer of the nanofiltration membrane obtained in Comparative Example II-1.

A nanofiltration membrane was prepared according to the method in Example II-3, except that during the preparation of a porous support layer with a bottom layer in the nanofiltration membrane, without undergoing an atomization pretreatment stage, directly immerse the ultrafiltration membrane in a solvent coagulation bath for a complete phase separation, and obtain a support layer after washing with water. See FIG. 2C for the cross-sectional morphology of the support layer.

In the composite nanofiltration membrane obtained in Comparative Example II-1, the thickness of the active separation layer was 46 nm. The mean pore size of the support layer was 14 nm.

Under the test conditions of an operating pressure of 0.5 MPa and a temperature of 25° C., the water flux and the rejection rate of the nanofiltration membranes prepared in the above Examples I-1 to 7 and Comparative Example II-1 were tested with 2 $g \cdot L^{-1}$ $MgSO_4$ aqueous solution. The results obtained from the tests are shown in Table II-1.

TABLE II-1

| nanofiltration membrane | support layer polymer material | atomization amount per unit membrane area ($L/m^2 \cdot h$) | support layer atomization pretreatment time (s) | support layer bulk porosity (%) | water flux ($L/m^2 \cdot h$) | rejection rate (%) |
|---|---|---|---|---|---|---|
| Example II-1 | Polyacrylonitrile | 6.2 | 20 | 73 | 81 ± 5 | 97.9 ± 0.1 |
| Example II-2 | Polyacrylonitrile | 10 | 20 | 76 | 87 ± 4 | 97.7 ± 0.2 |
| Example II-3 | Polyacrylonitrile | 17 | 20 | 78 | 89 ± 6 | 97.1 ± 0.6 |
| Example II-4 | Polyacrylonitrile | 17 | 10 | 75 | 85 ± 5 | 97.6 ± 0.3 |
| Example II-5 | Polyacrylonitrile | 17 | 30 | 80 | 87 ± 5 | 93.8 ± 0.5 |
| Example II-6 | Polyacrylonitrile | 17 | 40 | 84 | 85 ± 5 | 78.5 ± 0.8 |
| Example II-7 | Polyacrylonitrile | 17 | 50 | 88 | 80 ± 7 | 52.6 ± 1 |
| Comparative Example II-1 | Polyacrylonitrile | 0 | 0 | 71 | 74 ± 4 | 98.2 ± 0.5 |

From the results of the above Examples II-3 to 5 and Comparative Example II-1, it can be seen that the composite nanofiltration membrane prepared by using the support layer undergoing an atomization pretreatment has excellent water flux and salt rejection rate, and the water flux of the nanofiltration membrane increases with the increase of atomization time on the premise of maintaining a constant salt rejection rate. From Examples II-6 to 7, it can be seen that as the atomization time further increases, the surface pore size of the support layer increases, as is not conducive to the formation of a complete polyamide separation layer, and results in a significant decrease in the salt rejection rate of the nanofiltration membrane. From Examples II-1 to 3, it can be seen that the permeation flux of the nanofiltration membrane increases with the increase of atomization amount.

Example II-8

(1) Preparation of a porous support layer with a bottom layer: 12 g of polysulfone, 0.5 g of polyvinylpyrrolidone (PVP) were dissolved in 87.5 g of polarclean solvent, and heated with stirring at 100° C. to form a homogeneous solution, which was vacuumized for degassing; then, it was blade-coated on a nonwoven fabric with a continuous casting machine, with the initial casting height being controlled at 200 μm during coating, followed by facing one side of the coated nonwoven fabric uncoated with the membrane casting solution towards a droplet bath obtained by a deonized water ultrasonic atomization, staying in the droplet bath for 4 s and protecting another side coated with the membrane casting solution from contacting with atomized droplets, with an atomization amount of 17 L/m$^2$·h per unit membrane area; then the above thin film was immersed in a deionized water coagulation bath for a complete phase separation; after washing with water, a porous support layer with a bottom layer was obtained.

(2) Preparation of a composite membrane: a certain amount of an aqueous phase monomer piperazine (PIP) was weighed out into a volumetric flask, brought to the graduation with deionized water for a constant volume, and dissolved under ultrasound to form a homogeneous aqueous phase solution containing 0.5 w/v % PIP. A certain amount of an organic phase monomer trimesoyl chloride (TMC) was weighed out into a volumetric flask, brought to the graduation with ISOPAR solvent oil for a constant volume, and dissolved under ultrasound to form a homogeneous organic phase solution containing 0.1 w/v % TMC. The polysulfone porous support membrane prepared in step (1) was used for immersion in and contact with the above aqueous phase solution for 30 s. Afterwards, the excess aqueous phase solution was poured out, the surface of the membrane was dried by rolling with a clean rubber roller, and then the membrane was immersed in and brought into contact with an organic phase solution of trimesoyl chloride for 30 s. Afterwards, the excess organic phase solution was poured out, and the formed polyamide layer was dried in air. After treatment at room temperature for 4 min, a composite nanofiltration membrane was obtained. The prepared composite nanofiltration membrane was stored in deionized water for use in testing.

In the composite nanofiltration membrane obtained in Example II-8, the thickness of the bottom layer was 85 μm, the thickness of the sublayer of the porous support layer was 47 μm, the thickness of the surface layer of the porous support layer was 1.5 μm, the thickness of the active separation layer was 46 nm. The mean pore size of the surface layer of the support layer was 21 nm.

Example II-9

A nanofiltration membrane was prepared according to the method in Example II-8, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 6 s.

In the composite nanofiltration membrane obtained in Example II-9, the thickness of the bottom layer was 85 μm, the thickness of the sublayer of the porous support layer was 51 μm, the thickness of the surface layer of the porous support layer was 1.4 μm, the thickness of the active separation layer was 42 nm. The mean pore size of the surface layer of the support layer was 24 nm.

Example II-10

A nanofiltration membrane was prepared according to the method in Example II-8, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 8 s.

In the composite nanofiltration membrane obtained in Example II-10, the thickness of the bottom layer was 85 μm, the thickness of the sublayer of the porous support layer was 53 μm, the thickness of the surface layer of the porous support layer was 1.3 μm, the thickness of the active separation layer was 39 nm. The mean pore size of the surface layer of the support layer was 167 nm.

Example II-11

A nanofiltration membrane was prepared according to the method in Example II-8, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 12 s.

In the composite nanofiltration membrane obtained in Example II-11, the thickness of the bottom layer was 85 μm, the thickness of the sublayer of the porous support layer was 55 μm, the thickness of the surface layer of the porous support layer was 1.1 μm, the thickness of the active separation layer was 35 nm. The mean pore size of the surface layer of the support layer was 289 nm.

Example II-12

A nanofiltration membrane was prepared according to the method in Example II-8, except that during the preparation of a porous support layer with a bottom layer in the nanofiltration membrane in step (1), in the atomization pretreatment stage, face the side of the coated nonwoven fabric uncoated with the membrane casting solution towards a droplet bath obtained by a deonized water ultrasonic atomization, and stay in the droplet bath for 24 s.

In the composite nanofiltration membrane obtained in Example II-12, the thickness of the bottom layer was 85 μm, the thickness of the sublayer of the porous support layer was 57 μm, the thickness of the surface layer of the porous support layer was 1.0 μm, the thickness of the active separation layer was 34 nm. The mean pore size of the surface layer of the support layer was 402 nm.

Comparative Example II-2

A nanofiltration membrane was prepared according to the method in Example II-8, except that during the preparation of a porous support layer with a bottom layer in the nanofiltration membrane, without undergoing an atomization pretreatment stage, directly immerse the ultrafiltration membrane in a solvent coagulation bath for a complete phase separation, and obtain a porous support layer with a bottom layer after washing with water.

In the composite nanofiltration membrane obtained in Comparative Example II-2, the thickness of the active separation layer was 49 nm. The mean pore size of the support layer was 16 nm.

Under the test conditions of an operating pressure of 0.5 MPa and a temperature of 25° C., the water flux and the rejection rate of the nanofiltration membranes prepared in the above Examples I-8 to 12 and Comparative Example II-2 were tested with 2 $g \cdot L^{-1}$ $MgSO_4$ aqueous solution. The results obtained from the tests are shown in Table II-2.

TABLE II-2

| nanofiltration membrane | support layer polymer material | support layer atomization pretreatment time (s) | support layer bulk porosity (%) | water flux ($L/m^2 \cdot h$) | rejection rate (%) |
|---|---|---|---|---|---|
| Example II-8 | Polysufone | 4 | 72 | 113 ± 2 | 94.7 ± 0.4 |
| Example II-9 | Polysufone | 6 | 76 | 120 ± 1 | 95.2 ± 1.1 |
| Example II-10 | Polysufone | 8 | 79 | 108 ± 2 | 81.2 ± 0.6 |
| Example II-11 | Polysufone | 12 | 81 | 105 ± 4 | 72.7 ± 1.7 |
| Example II-12 | Polysufone | 24 | 84 | 88 ± 2 | 57.4 ± 0.9 |
| Comparative Example II-2 | Polysufone | 0 | 65 | 90 ± 1 | 97.1 ± 1.4 |

From the results of the above Examples II-8 to 9 and Comparative Example II-2, it can be seen that the nanofiltration membrane prepared by using the porous support layer with a bottom layer undergoing atomization pretreatment has excellent water flux and salt rejection rate. Therein, the atomization time has a great influence on the permeability of the nanofiltration membrane. When the atomization pretreatment time is within a certain range, the pore size of the surface layer of the support layer is relatively small, as is conducive to the formation of a complete polyamide active layer during the interfacial polymerization, and improves the separation permeability of the membrane. The water flux and the salt rejection rate of the nanofiltration membrane reduce dramatically with the continued increase of the atomization pretreatment time.

Example III

The series of Example III illustrate the composite forward osmosis membrane according to the present invention.

According to one preferable embodiment III of the present invention, the preparation method of the composite forward osmosis membrane can be carried out according to the following steps:

1') dissolving components containing a polymer in a solvent to prepare a membrane casting solution;

2') blade-coating the membrane casting solution into a film on a bottom layer;

3') performing an atomization pretreatment, i.e. staying in an atomized droplet bath for a certain period of time, wherein one side of the bottom layer uncoated with the membrane casting solution is faced towards atomized droplets and another side coated with the membrane casting solution is protected from contacting with the atomized droplets;

4') immersing in a coagulation bath to obtain the polymer porous support layer with the bottom layer;

5') contacting the porous support layer with the bottom layer with an aqueous phase solution of an aromatic compounds containing two or more amino groups after dilution for 5 to 150 s;

6') rolling the porous support layer with the bottom layer after immersion in the aqueous phase solution with a rubber roller to remove an excess aqueous phase solution;

7') contacting the porous support layer with the bottom layer from which the excess aqueous phase solution is removed with an organic phase solution of acyl chloride compound containing two or more acyl chloride groups for 5 to 150 s, and generating a dense functional layer on the surface of the porous support layer through an interfacial polymerization reaction;

8') finally, after naturally drying in air, treating the above resulting primary membrane for 1-5 min at a certain temperature; after washing with water, the forward osmosis composite membrane of the present invention is obtained.

The water flux and the reverse diffusion salt flux are important parameters for evaluating a forward osmosis composite membrane.

The water flux of the membrane is a parameter that characterizes the permeability of the membrane, refers to the volume of water penetrating through the membrane per unit area and per unit time, and has a common unit of $L/m^2 \cdot h$. The prepared forward osmosis composite membrane was placed inside a testing device, and at room temperature, the volume of water in a feed solution, which reached an draw solution side through the forward osmosis membrane within a certain period of time, was determined. The specific calculation method is as follows:

$$J_w = \Delta V / \Delta t \cdot A_m$$

wherein:

$J_w$—water flux ($L/m^2 \cdot h$);

ΔV—volume change of feed solution within time t (L);

$A_m$—area of the test film ($m^2$);

Δt—test time (h).

The reverse diffusion salt flux is a parameter that characterizes the separation performance of a composite membrane, and has a common unit of $g/m^2h$. A conductivity meter is used to test the change in conductance in the feed solution, and a standard curve is drawn to fit the change in concentration of the feed solution. The calculation is carried out according to the following formula:

$$J_{s=}(C_t V_t - C_0 V_0)/\Delta t \cdot \Delta_m$$

wherein:

$J_s$—reverse diffusion salt flux ($g/m^2 \cdot h$);

$C_t$—concentration (g/L) of feed solution at time t;

$V_t$—volume (L) of feed solution at time t;

$C_0$—concentration (g/L) of feed solution at time t=0;

$V_0$—volume (L) of feed solution at time t=0;

$A_m$—area ($m^2$) of the test film;

$\Delta_t$—test time (h).

The water flux and the reverse diffusion salt flux of the forward osmosis composite membrane were tested on a forward osmosis testing device. The test conditions are as follows: at 25° C., by using 1 M $MgCl_2$ as an draw solution and deionized water as feed solution, the water flux and the reverse diffusion salt flux of the forward osmosis composite membrane are tested using a forward osmosis testing device.

In the Examples of the present invention, all the chemical reagents used are commercially available products, without a special purification treatment unless otherwise specified.

Spray equipment: Haoqi HQ-JS130H is selected as an ultrasonic humidifier;

Example III-1

(3) Preparation of a porous support layer with a bottom layer: 12 g of polyacrylonitrile was dissolved in 88 g of DMF solvent, and heated with stirring at 50° C. to form a homogeneous solution (membrane casting solution), which was vacuumized for degassing; then, it was blade-coated on a nonwoven fabric (bottom layer) with a continuous casting machine, with the initial casting height being controlled at 150 μm during coating, followed by facing one side of the coated nonwoven fabric uncoated with the membrane casting solution towards a droplet bath obtained by a deonized water ultrasonic atomization, staying in the droplet bath for 20 s and protecting another side coated with the membrane casting solution from contacting with atomized droplets, with an atomization amount of 6.2 $L/m^2 \cdot h$ per unit membrane area; then the above thin film was immersed in a deionized water coagulation bath for a complete phase separation; after washing with water, a porous support layer with a bottom layer was obtained.

(4) Preparation of a composite membrane: a certain amount of an aqueous phase monomer m-Phenylenediamine (MPD) was weighed out into a volumetric flask, brought to the graduation with deionized water for a constant volume, and dissolved under ultrasound to form a homogeneous aqueous phase solution containing 2 w/v % MPD. A certain amount of an organic phase monomer trimesoyl chloride (TMC) was weighed out into a volumetric flask, brought to the graduation with ISOPAR solvent oil for a constant volume, and dissolved under ultrasound to form a homogeneous organic phase solution containing 0.1 w/v % TMC. The polyacrylonitrile porous support membrane prepared in step (1) was used for immersion in and contact with the above aqueous phase solution for 60 s. Afterwards, the excess aqueous solution was poured out, the surface of the membrane was dried by rolling with a clean rubber roller, and then the membrane was immersed in and brought into contact with an organic phase solution of trimesoyl chloride for 60 s. Afterwards, the excess organic phase solution was poured out, and then the formed polyamide layer was dried in air. After treatment at room temperature for 4 min, a composite forward osmosis membrane was obtained. The prepared composite forward osmosis membrane was stored in deionized water for use in testing.

In the composite forward osmosis membrane obtained in Example III-1, the thickness of the bottom layer was 85 μm, the thickness of the sublayer of the porous support layer was 43 μm, the thickness of the surface layer of the porous support layer was 2.2 μm, the thickness of the active separation layer was 45 nm. The mean pore size of the surface layer of the support layer was 16 nm. The bulk porosity of the porous support layer was 72%.

Example III-2

(1) Preparation of a porous support layer with a bottom layer: a porous support layer with a bottom layer in the forward osmosis membrane was prepared according to the method in Example III-1, except that the atomization amount of the atomized droplets used in the atomization pretreatment stage was 10 $L/m^2 \cdot h$ during the preparation.

(2) Preparation of a composite membrane: the same as Example III-1.

In the composite forward osmosis membrane obtained in Example III-2, the thickness of the bottom layer was 85 μm, the thickness of the sublayer of the porous support layer was 45 μm, the thickness of the surface layer of the porous support layer was 2.1 μm, the thickness of the active separation layer was 43 nm. The mean pore size of the surface layer of the support layer was 17 nm. The bulk porosity of the porous support layer was 75%.

Example III-3

(1) Preparation of a porous support layer with a bottom layer: a porous support layer with a bottom layer in the forward osmosis membrane was prepared according to the method in Example III-1, except that the atomization amount of the atomized droplets used in the atomization pretreatment stage was 17 $L/m^2 \cdot h$ during the preparation.

(2) Preparation of a composite membrane: the same as Example III-1.

In the composite forward osmosis membrane obtained in Example III-3, the thickness of the bottom layer was 85 μm, the thickness of the sublayer of the porous support layer was 47 μm, the thickness of the surface layer of the porous support layer was 1.9 μm, the thickness of the active separation layer was 42 nm. The mean pore size of the surface layer of the support layer was 18 nm. The bulk porosity of the porous support layer was 79%.

Example III-4

(1) Preparation of a porous support layer with a bottom layer: a porous support layer with a bottom layer in the forward osmosis membrane was prepared according to the method in Example III-3, except that during preparation, in the atomization pretreatment stage, face the side of the coated nonwoven fabric uncoated with the membrane casting solution towards a droplet bath obtained by a deonized water ultrasonic atomization, and stay in the droplet bath for 10 s.

(2) Preparation of a composite membrane: the same as Example III-1.

In the composite forward osmosis membrane obtained in Example III-4, the thickness of the bottom layer was 85 μm, the thickness of the sublayer of the porous support layer was 45 μm, the thickness of the surface layer of the porous support layer was 2.1 μm, the thickness of the active separation layer was 44 nm. The mean pore size of the surface layer of the support layer was 17 nm. The bulk porosity of the porous support layer was 74%.

Example III-5

Figure 3A:
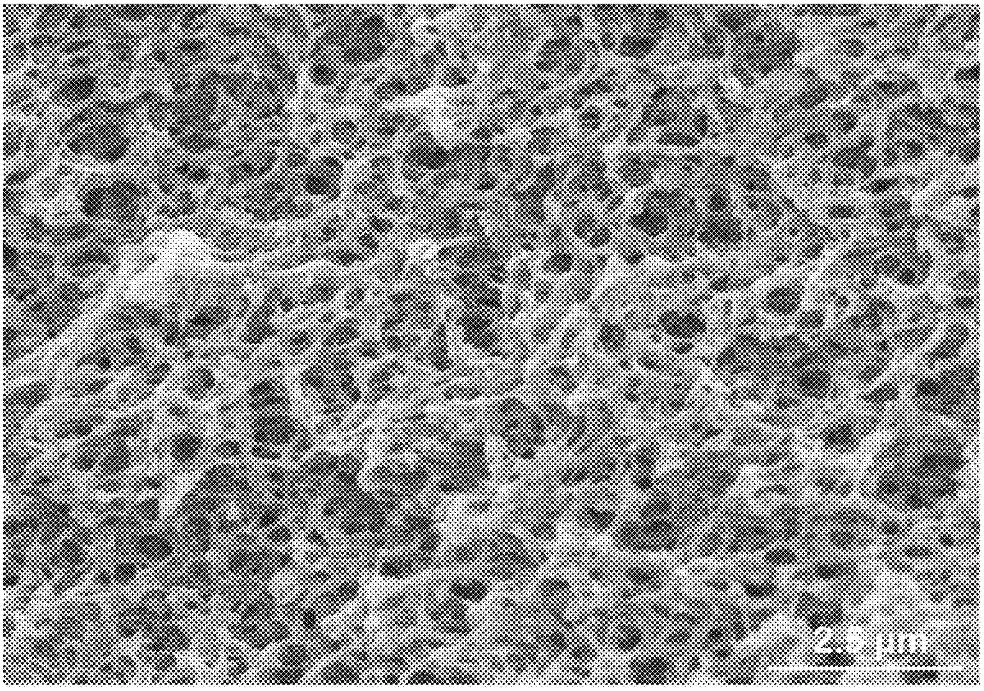
FIG. 3A is a cross-sectional morphological image of the porous support layer of the composite forward osmosis membrane obtained in Example III-5.
Figure 3B:
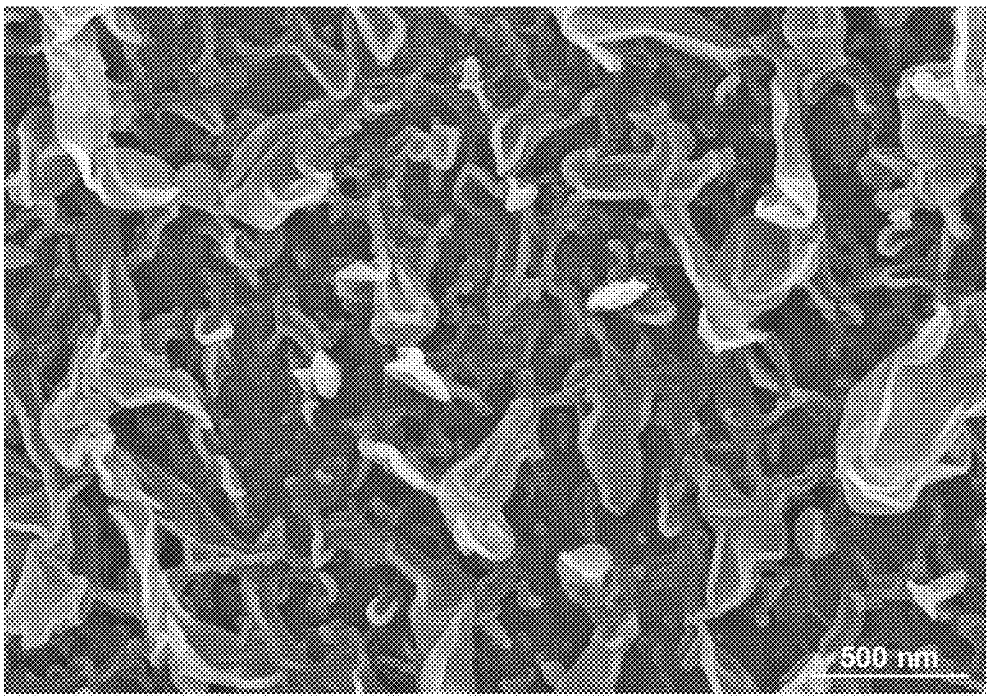
FIG. 3B is a surface morphological image of the composite forward osmosis membrane obtained in Example III-5.

(1) Preparation of a porous support layer with a bottom layer: a porous support layer with a bottom layer in the forward osmosis membrane was prepared according to the method in Example III-3, except that in the atomization pretreatment stage, face the side of the coated nonwoven fabric uncoated with the membrane casting solution towards a droplet bath obtained by a deonized water ultrasonic atomization, and stay in the droplet bath for 30 s. See FIG. 3A for the cross-sectional morphology of the porous support layer in the forward osmosis membrane and see FIG. 3B for the surface morphology of the forward osmosis membrane.

(2) Preparation of a composite membrane: the same as Example III-1.

In the composite forward osmosis membrane obtained in Example III-5, the thickness of the bottom layer was 85 μm, the thickness of the sublayer of the porous support layer was 47 μm, the thickness of the surface layer of the porous support layer was 1.6 μm, the thickness of the active separation layer was 40 nm. The mean pore size of the surface layer of the support layer was 24 nm. The bulk porosity of the porous support layer was 83%.

Example III-6

(1) Preparation of a porous support layer with a bottom layer: 12 g of polysulfone was dissolved in 88 g of polarclean solvent, and heated with stirring at 100° C. to form a homogeneous solution, which was vacuumized for degassing; then, it was blade-coated on a nonwoven fabric with a continuous casting machine, with the initial casting height being controlled at 150 μm during coating, followed by facing one side of the coated nonwoven fabric uncoated with the membrane casting solution towards a droplet bath obtained by a deonized water ultrasonic atomization, staying in the droplet bath for 4 s and protecting the side coated with the membrane casting solution from contacting with atomized droplets, with an atomization amount of 17 $L/m^2 \cdot h$ per unit membrane area; then the above thin film was immersed in a deionized water coagulation bath for a complete phase separation; after washing with water, a porous support layer with a bottom layer was obtained.

(2) Preparation of a composite membrane: the same as Example III-1.

In the composite forward osmosis membrane obtained in Example III-6, the thickness of the bottom layer was 85 μm, the thickness of the sublayer of the porous support layer was 45 μm, the thickness of the surface layer of the porous support layer was 1.6 μm, the thickness of the active separation layer was 44 nm. The mean pore size of the surface layer of the support layer was 22 nm. The bulk porosity of the porous support layer was 73%.

Example III-7

(1) A forward osmosis membrane was prepared according to the method in Example III-6, except that during the preparation of a porous support layer with a bottom layer in the forward osmosis membrane, in the atomization pretreatment stage, face one side of the coated nonwoven fabric uncoated with the membrane casting solution towards a droplet bath obtained by a deonized water ultrasonic atomization, and stay in the droplet bath for 6 s.

(2) Preparation of a composite membrane: the same as Example III-1.

In the composite forward osmosis membrane obtained in Example III-7, the thickness of the bottom layer was 85 μm, the thickness of the sublayer of the porous support layer was 49 μm, the thickness of the surface layer of the porous support layer was 1.4 μm, the thickness of the active separation layer was 41 nm. The mean pore size of the surface layer of the support layer was 26 nm. The bulk porosity of the porous support layer was 75%.

Comparative Example III-1

Figure 3C:
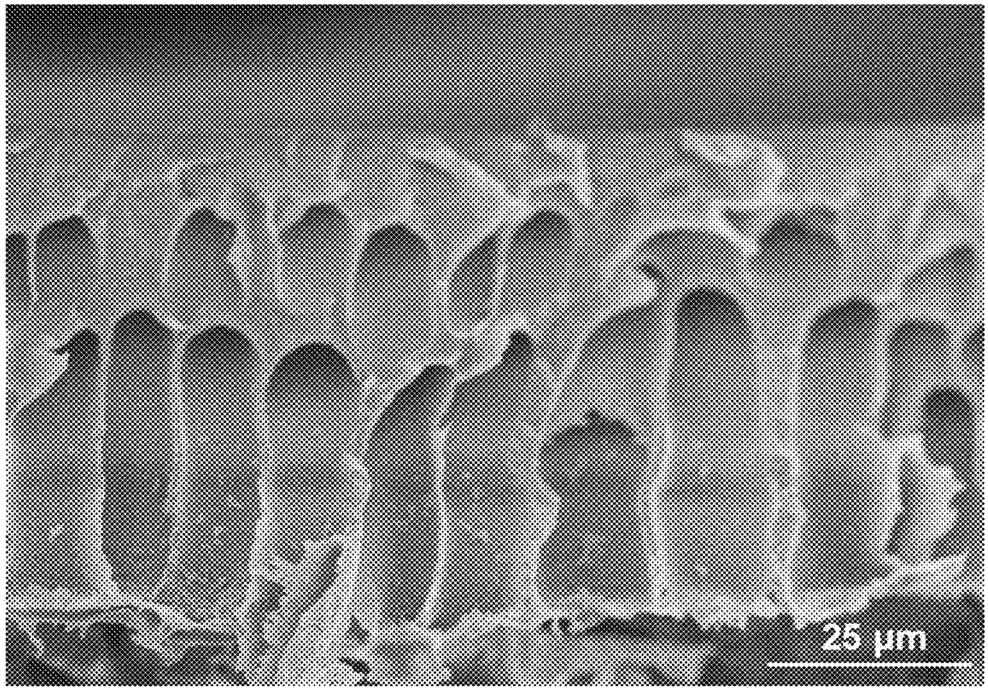
FIG. 3C is a cross-sectional morphological image of the support layer of the composite forward osmosis membrane obtained in Comparative Example III-1.

(1) A forward osmosis membrane was prepared according to the method in Example III-3, except that during the preparation of a porous support layer with a bottom layer in the forward osmosis membrane, without undergoing an atomization pretreatment stage, directly immerse the ultrafiltration membrane in a solvent coagulation bath for a complete phase separation, and obtain a porous support layer with a bottom layer after washing with water. See FIG. 3C for the cross-sectional morphology of the support layer.

(2) Preparation of a composite membrane: the same as Example III-3.

In the composite forward osmosis membrane obtained in Comparative Example III-1, the thickness of the active separation layer was 50 nm. The mean pore size of the support layer was 13 nm. The bulk porosity of the support layer was 70%.

Example III-2

(1) A forward osmosis membrane was prepared according to the method in Example III-6, except that during the preparation of a porous support layer with a bottom layer in the forward osmosis membrane, without undergoing an atomization pretreatment stage, directly immerse the ultrafiltration membrane in a solvent coagulation bath for a complete phase separation, and obtain a porous support layer with a bottom layer after washing with water.

(2) Preparation of a composite membrane: the same as Example III-6.

In the composite forward osmosis membrane obtained in Comparative Example III-2, the thickness of the active separation layer was 52 nm. The mean pore size of the support layer was 16 nm. The bulk porosity of the support layer was 67%.

Performance tests of the water flux, the reverse diffusion salt flux and the salt rejection rate were carried out on the composite forward osmosis membranes prepared in Examples III-1 to 7 and Comparative Examples III-1 to 2.

The water flux and the reverse diffusion salt flux of the forward osmosis composite membrane were tested in a forward osmosis testing system.

At 25° C., by using 1 M $MgCl_2$ aqueous solution as an draw solution and deionized water as feed solution, the water flux and the reverse diffusion salt flux of the composite forward osmosis membrane were tested using a forward osmosis testing device. The results obtained from the tests are shown in Table III-1.

TABLE III-1

| forward osmosis membrane | support layer polymer material | interfacial polymerization aqueous phase monomer and content | interfacial polymerization organic phase monomer and content | support layer atomization pretreatment time (s) | atomization amount per unit membrane area (LMH) | water flux (LMH) AL-FS test mode | water flux (LMH) AL-DS test mode | reverse salt diffusion flux (gMH) AL-FS test mode | reverse salt diffusion flux (gMH) AL-DS test mode |
|---|---|---|---|---|---|---|---|---|---|
| Example III-1 | polyacrylonitrile | 2 w/v % MPD | 0.1 w/v % TMC | 20 | 6.2 | 8 ± 3 | 23 ± 2 | 2 ± 2 | 3 ± 1 |
| Example III-2 | polyacrylonitrile | 2 w/v % MPD | 0.1 w/v % TMC | 20 | 10 | 11 ± 2 | 26 ± 1 | 2 ± 1 | 4 ± 2 |
| Example III-3 | polyacrylonitrile | 2 w/v % MPD | 0.1 w/v % TMC | 20 | 17 | 13 ± 1 | 31 ± 2 | 2 ± 1 | 5 ± 1 |
| Example III-4 | polyacrylonitrile | 2 w/v % MPD | 0.1 w/v % TMC | 10 | 17 | 9 ± 2 | 25 ± 3 | 2 ± 2 | 4 ± 1 |
| Example III-5 | polyacrylonitrile | 2 w/v % MPD | 0.1 w/v % TMC | 30 | 17 | 11 ± 3 | 22 ± 4 | 12 ± 1 | 42 ± 5 |
| Example III-6 | polysulfone | 2 w/v % MPD | 0.1 w/v % TMC | 4 | 17 | 10 ± 1 | 23 ± 2 | 2 ± 1 | 4 ± 2 |
| Example III-7 | polysulfone | 2 w/v % MPD | 0.1 w/v % TMC | 6 | 17 | 12 ± 2 | 26 ± 3 | 4 ± 1 | 7 ± 3 |
| Comparative Example III-1 | polyacrylonitrile | 2 w/v % MPD | 0.1 w/v % TMC | 0 | 0 | 6 ± 1 | 22 ± 3 | 3 ± 1 | 3 ± 2 |
| Comparative Example III-2 | polysulfone | 2 w/v % MPD | 0.1 w/v % TMC | 0 | 0 | 7 ± 2 | 19 ± 3 | 4 ± 2 | 5 ± 1 |

From the testing results of the above Examples III-1 to 7 and Comparative Example III-2, it can be seen that the composite forward osmosis membrane prepared by using the porous support layer with the bottom layer undergoing atomization pretreatment has excellent water flux, and has a significantly improved water flux while keeping the reverse diffusion salt flux relatively low. When the atomization time continues to increase, the pore size of the support layer surface increases gradually, as is not conducive to the formation of a complete polyamide separation layer during the interfacial polymerization, and leads to a dramatic increase of the reverse diffusion salt flux and a reduction in membrane performance. As can be seen from Examples III-1 to 3, the permeation flux of the forward osmosis membrane increases with the increase of atomization amount. In addition, the process of atomization pretreatment can be applied in many polymer membrane production materials and can effectively improve the permeation performance of the composite membrane.

The invention claimed is:

1. An ultrafiltration membrane, comprising a bottom layer and a polymer layer disposed on the bottom layer, wherein the polymer layer comprises a sublayer and a surface layer, the surface layer is of a porous structure with a narrow pore size distribution, and the sublayer is of a bicontinuous highly interconnected three-dimensional network porous structure having an X-axis, a Y-axis, and a Z-axis;

wherein the X-axis is in a length direction of the sublayer, the Y-axis is in a width direction of the sublayer, and the Z-axis is in a thickness direction of the sublayer, and a bicontinuous highly interconnected three-dimensional porous structure means a porosity on any of XY cross-sections perpendicular to the thickness direction of 40-90%, and a difference between porosities of any two XY cross-sections does not exceed 10%.

2. The ultrafiltration membrane according to claim 1, wherein: in a length direction of the sublayer, a porosity on any of YZ cross-sections perpendicular to the length direction is 40-90%, and a difference between porosities of any two YZ cross-sections does not exceed 10%; and in a width direction of the sublayer, a porosity on any of XZ cross-sections perpendicular to the width direction is 40-90%, and a difference between porosities of any two XZ cross-sections in the width direction does not exceed 10%.

3. The ultrafiltration membrane according to claim 2, wherein a difference between any two selected from porosities of XY cross-sections, porosities of YZ cross-sections, and porosities of XZ cross-sections does not exceed 10%.

4. The ultrafiltration membrane according to claim 1, wherein:

the polymer is at least one selected from polyvinyl chloride, polysulfone, polyethersulfone, sulfonated polyethersulfone, polyacrylonitrile, cellulose acetate, polyvinylidene fluoride, polyimide, polyacrylic acid, polylactic acid, polyamide, chitosan, polyetherimide, polystyrene, polyolefin, polyester, polytrifluorochloroethylene, silicone resin, and acrylonitrile-styrene copolymer; and/or, the bottom layer is selected from at least one selected from nonwoven fabrics, woven fabrics, polyester screens, and electrospun films.

5. The ultrafiltration membrane according to claim 4, wherein the polymer is polysulfone; and a water flux of the ultrafiltration membrane obtained by using polysulfone is approximately 1200 LMH or higher; and/or a water flux volume equivalent of the ultrafiltration membrane obtained by using polysulfone is approximately 1700 or higher; and/or a water flux surface equivalent of the ultrafiltration membrane obtained by using polysulfone is approximately 10 or higher.

6. The ultrafiltration membrane according to claim 4, wherein the polymer is polyacrylonitrile; and a water flux of the ultrafiltration membrane obtained by using polyacrylonitrile is approximately 300 LMH or higher; and/or a water flux volume equivalent of the ultrafiltration membrane obtained by using polyacrylonitrile is approximately 400 or higher; and/or a water flux surface equivalent of the ultrafiltration membrane obtained by using polyacrylonitrile is approximately 5 or higher.

7. The ultrafiltration membrane according to claim 1, wherein a mean pore size of the surface layer is 2-100 nm.

8. The ultrafiltration membrane according to claim 1, wherein a thickness of the bottom layer is 50-300 μm, a thickness of the sublayer is 10-60 μm, and a thickness of the surface layer is 0.5-5 μm.

9. The ultrafiltration membrane according to claim 1, wherein a porosity of the polymer layer is 40-90%.

10. The ultrafiltration membrane according to claim 1, wherein:

the polymer layer is prepared by an atomization pretreatment and a non-solvent induced phase separation method, the atomization pretreatment being staying in an atomized droplet bath, wherein one side of the bottom layer is faced towards atomized droplets and another side of the membrane coated with a membrane casting solution is protected from contacting with the atomized droplets.

11. A method for preparing the ultrafiltration membrane according to claim 1, comprising the following steps:

1) dissolving components containing a polymer in a solvent to prepare a membrane casting solution;

2) blade-coating the membrane casting solution into a film on a bottom layer to form a bottom layer coated with the membrane casting solution;

3) performing an atomization pretreatment on the bottom layer coated with the membrane casting solution, including staying in a droplet bath, wherein one side of the bottom layer coated with the membrane casting solution is protected from contacting with atomized droplets, and another side of the bottom layer uncoated with the membrane casting solution is faced towards the atomized droplets to obtain an atomization pretreated membrane; and 4) immersing the atomization pretreated membrane in a coagulation bath to obtain the ultrafiltration membrane.

12. The method for preparing the ultrafiltration membrane according to claim 11, wherein in step 1), a concentration of the polymer in the membrane casting solution is 60-200 g/L; and/or, the solvent is a good solvent for the polymer.

13. The method for preparing the ultrafiltration membrane according to claim 11, wherein:

in step 2), a thickness of the blade-coated films is 50-500 μm.

14. The method for preparing the ultrafiltration membrane according to claim 11, wherein in step 3), a size of the droplets in the droplet bath is 1-50 μm; and/or, an atomization pretreatment time is 1-60 seconds; and/or, a required atomization amount per unit membrane area is 2.5-20 $L/m^2 \cdot h$; and/or, the droplets are of a poor solvent for the polymer.

15. The method for preparing the ultrafiltration membrane according to claim 11, wherein in step 4), the coagulation bath is a poor solvent for the polymer.

16. The method for preparing the ultrafiltration membrane according to claim 12, wherein:

the good solvent for the polymer is selected from at least one of N, N-dimethylformamide, N, N-dimethylacetamide, acetone, N-methyl-2-pyrrolidone, dimethyl sulfoxide, tetramethylsulfoxide, tetrahydrofuran, dioxane, acetonitrile, chloroform, polarclean solvent, triethyl phosphate, trimethyl phosphate, hexamethylammonium phosphate, tetramethylurea, acetonitrile, toluene, hexane, and octane; and the poor solvent for the polymer is selected from at least one of water, ethanol, and ethylene glycol.

17. The ultrafiltration membrane obtained by the method according to claim 11.

18. A composite nanofiltration membrane, sequentially comprising the ultrafiltration membrane according to claim 1 and a polyamide layer disposed thereon.

19. The composite nanofiltration membrane according to claim 18, wherein the polymer layer of the ultrafiltration membrane supports the polyamide layer.

20. The composite nanofiltration membrane according to claim 18, wherein a mean pore size of the surface layer of the polymer layer is 10-50 nm; and/or a thickness of the polyamide layer is 5-100 nm.

21. The composite nanofiltration membrane according to claim 18, wherein:

the polyamide layer is prepared by an interfacial polymerization reaction of an aliphatic multifunctional amine compound and an aromatic multifunctional acyl chloride compound, wherein the aliphatic multifunctional amine compound is at least one selected from polyethylene imine, ethylenediamine, piperazine, and 4-aminomethylpiperazine, and the aromatic multifunctional acyl chloride compound is at least one selected from terephthaloyl chloride, isophthaloyl chloride, phthaloyl dichloride, biphenyldicarbonyl chloride, benzene disulfo chloride, and trimesoyl chloride.

22. The composite nanofiltration membrane according to claim 18, wherein the polymer is polysulfone; and a water flux of the composite nanofiltration membrane obtained by using polysulfone is approximately 100 LMH or higher; and/or a water flux volume equivalent of the composite nanofiltration membrane support layer obtained by using polysulfone is approximately 1800 or higher; and/or a water flux surface equivalent of the composite nanofiltration membrane support layer obtained by using polysulfone is about 5 or higher.

23. The composite nanofiltration membrane according to claim 18, wherein the polymer is polyacrylonitrile; and a water flux of the composite nanofiltration membrane obtained by using polyacrylonitrile is approximately 80 LMH or higher; and/or a water flux volume equivalent of the composite nanofiltration membrane support layer obtained by using polyacrylonitrile is about 400 or higher; and/or a water flux surface equivalent of the composite nanofiltration membrane support layer obtained by using polyacrylonitrile is about 5 or higher.

24. A composite forward osmosis membrane, sequentially comprising the ultrafiltration membrane according to claim 1 and an aromatic polyamide layer disposed thereon.

25. The composite forward osmosis membrane according to claim 24, wherein the polymer layer of the ultrafiltration membrane supports the aromatic polyamide layer.

26. The composite forward osmosis membrane according to claim 24, wherein a mean pore size of the surface layer of the polymer layer is 5-100 nm; and/or a thickness of the aromatic polyamide layer is 5-180 nm.

27. The composite forward osmosis membrane according to claim 24, wherein:

the aromatic polyamide layer is prepared by an interfacial polymerization reaction of an aromatic multifunctional amine compound and an aromatic multifunctional acyl chloride compound, wherein the aromatic multifunctional amine compound is at least one selected from m-phenylenediamine, 1,2-diaminobenzene, p-phenylenediamine, 1,3,5-benzenetriamine, 1,2,4-triaminobenzene, 3,5-diaminobenzoic acid, 2,4-diaminotoluene, 2,4-diaminoanisole, amidol, xylylene diamine, and the aromatic multifunctional acyl chloride compound is at least one selected from terephthaloyl chloride, isophthaloyl chloride, phthaloyl dichloride, biphenyldicarbonyl chloride, benzene disulfo chloride, and trimesoyl chloride.

28. The composite forward osmosis membrane according to claim 24, wherein the polymer is polysulfone; and a water flux of the composite forward osmosis membrane obtained by using polysulfone is approximately 10 LMH or higher (AL-FS); and/or a water flux volume equivalent of the composite forward osmosis membrane support layer obtained by using polysulfone is about 10 or higher (AL-FS); and/or a water flux surface equivalent of the composite forward osmosis membrane support layer obtained by using polysulfone is approximately 0.4 or higher (AL-FS).

29. The composite forward osmosis membrane according to claim 24, wherein the polymer is polyacrylonitrile; and a water flux of the composite forward osmosis membrane obtained by using polyacrylonitrile is approximately 8 LMH or higher (AL-FS); and/or a water flux volume equivalent of the composite forward osmosis membrane support layer obtained by using polyacrylonitrile is approximately 10 or higher (AL-FS); and/or a water flux surface equivalent of the composite forward osmosis membrane support layer obtained by using polyacrylonitrile is approximately 0.4 or higher (AL-FS).

* * * * *